July 17, 1934.  J. H. McELROY  1,966,900
SHEET FEEDING DEVICE
Filed July 22, 1929  10 Sheets-Sheet 7

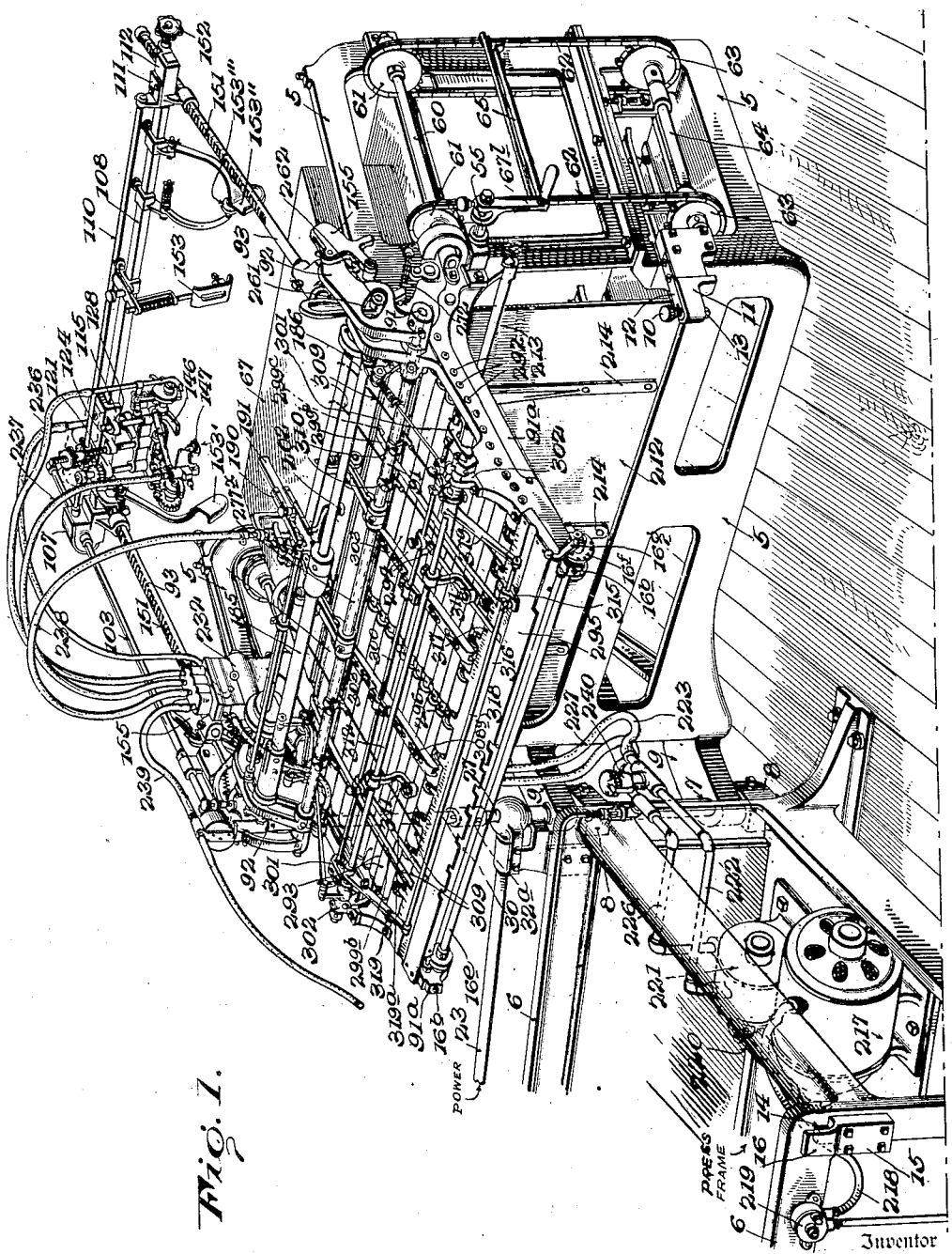

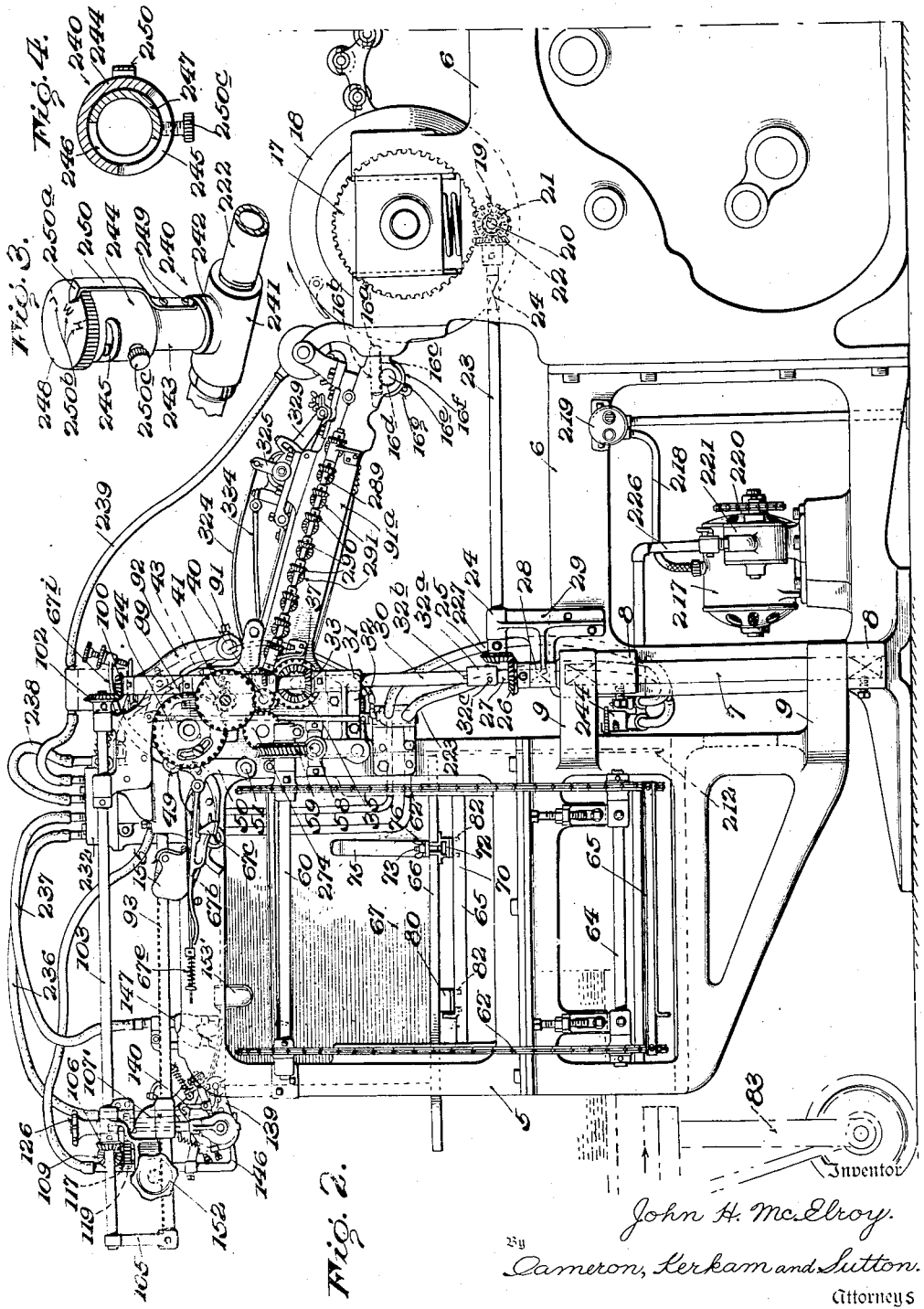

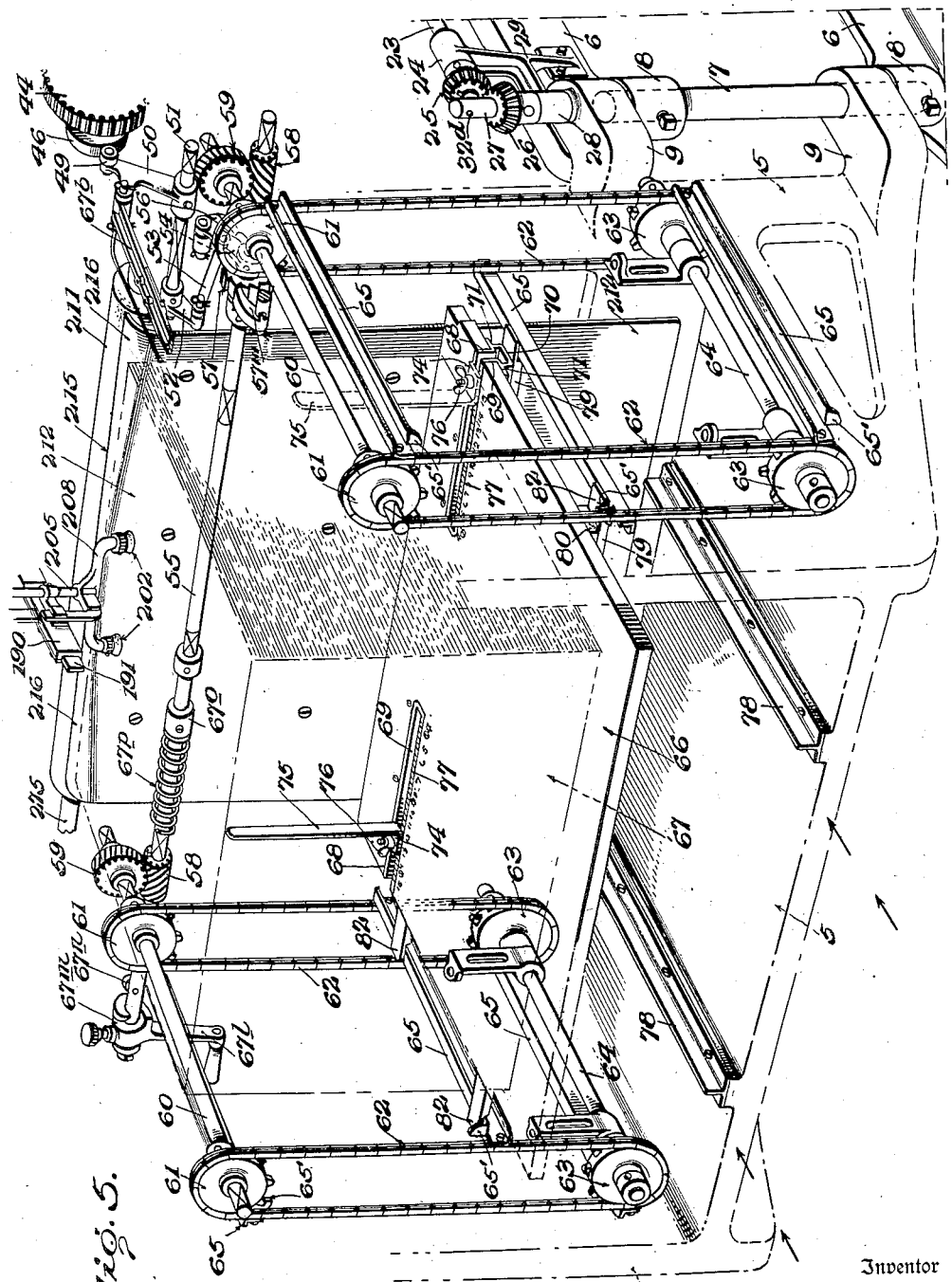

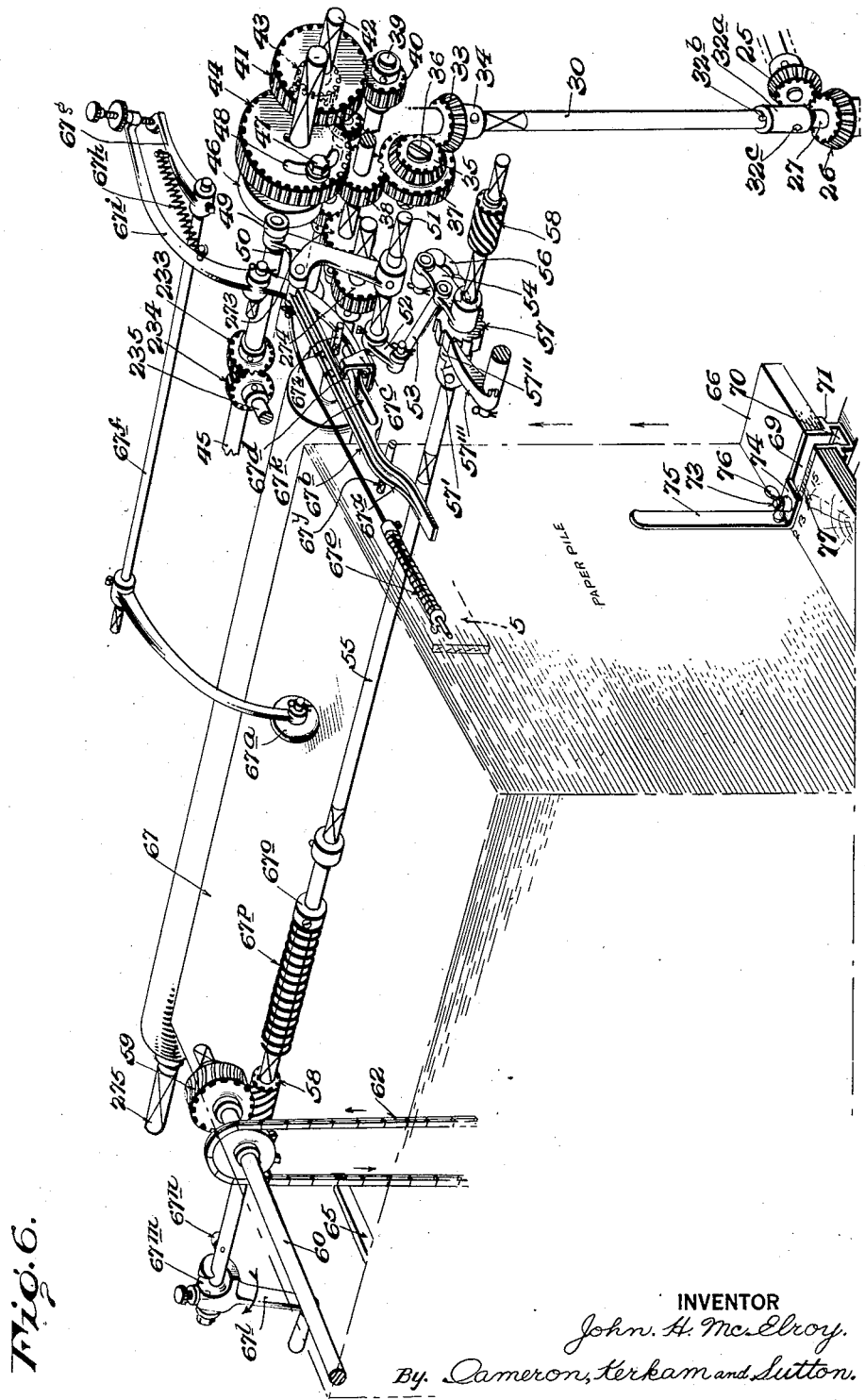

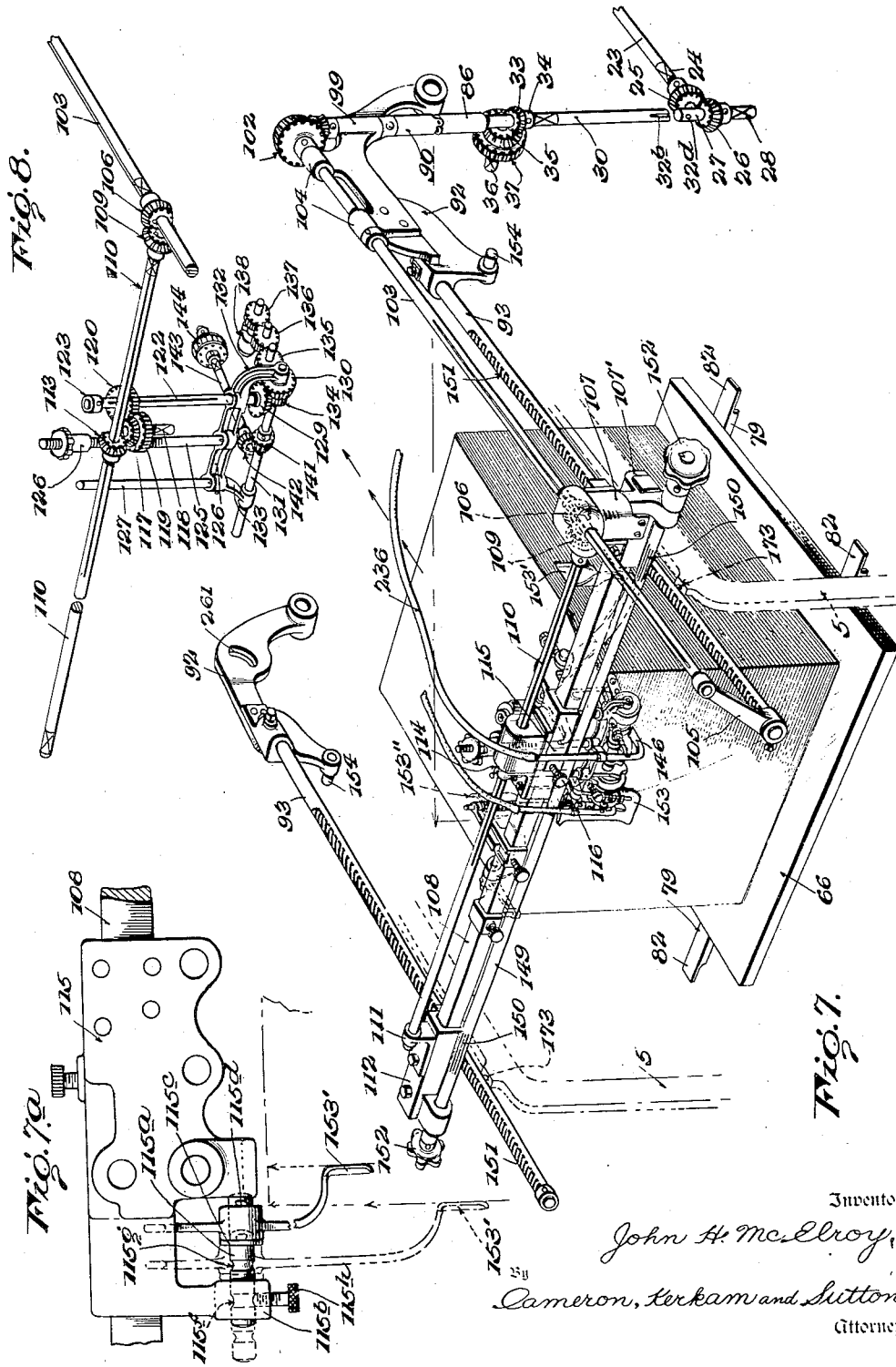

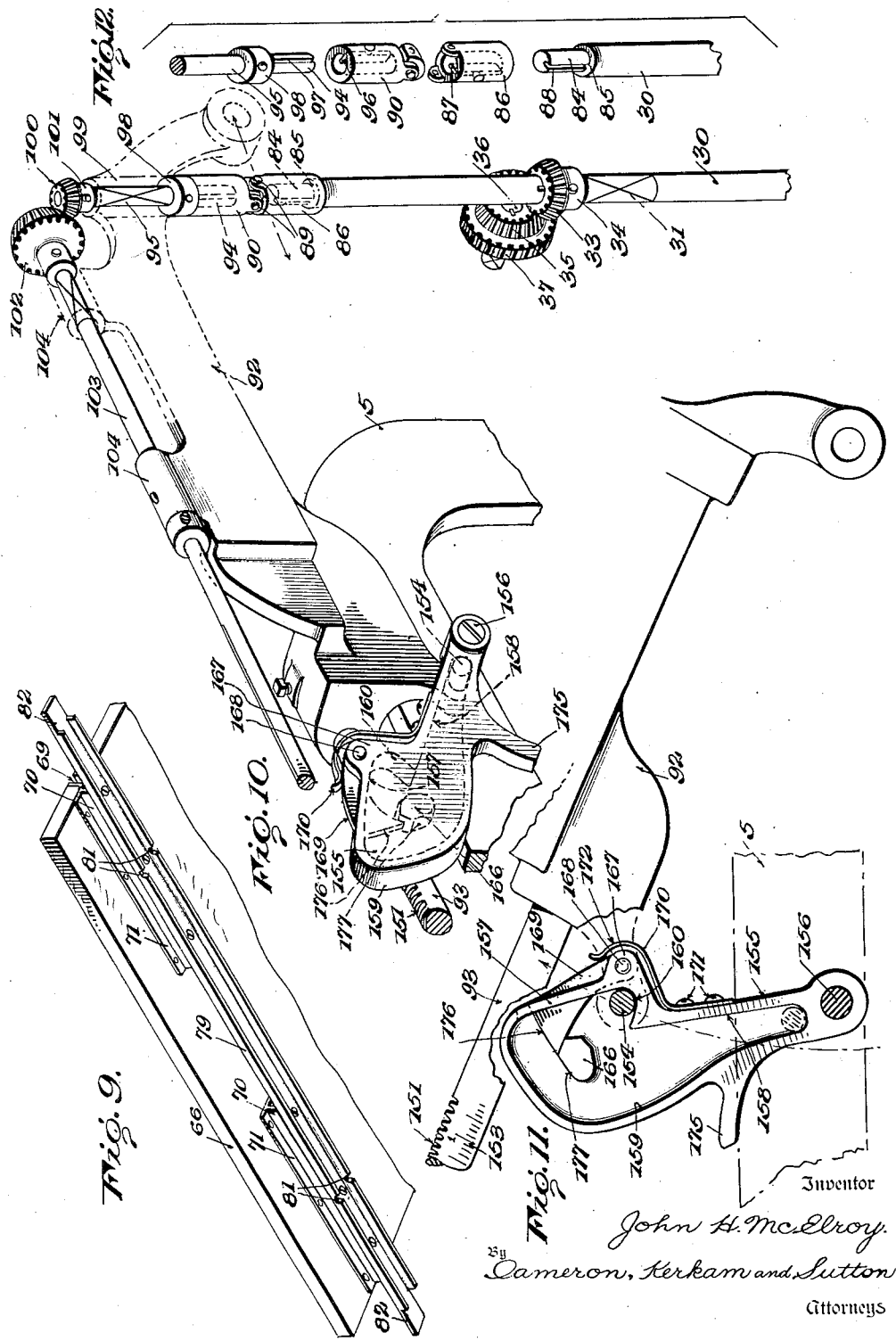

Fig. 13.

Inventor
John H. McElroy.
By Cameron, Kerkam and Sutton,
Attorneys

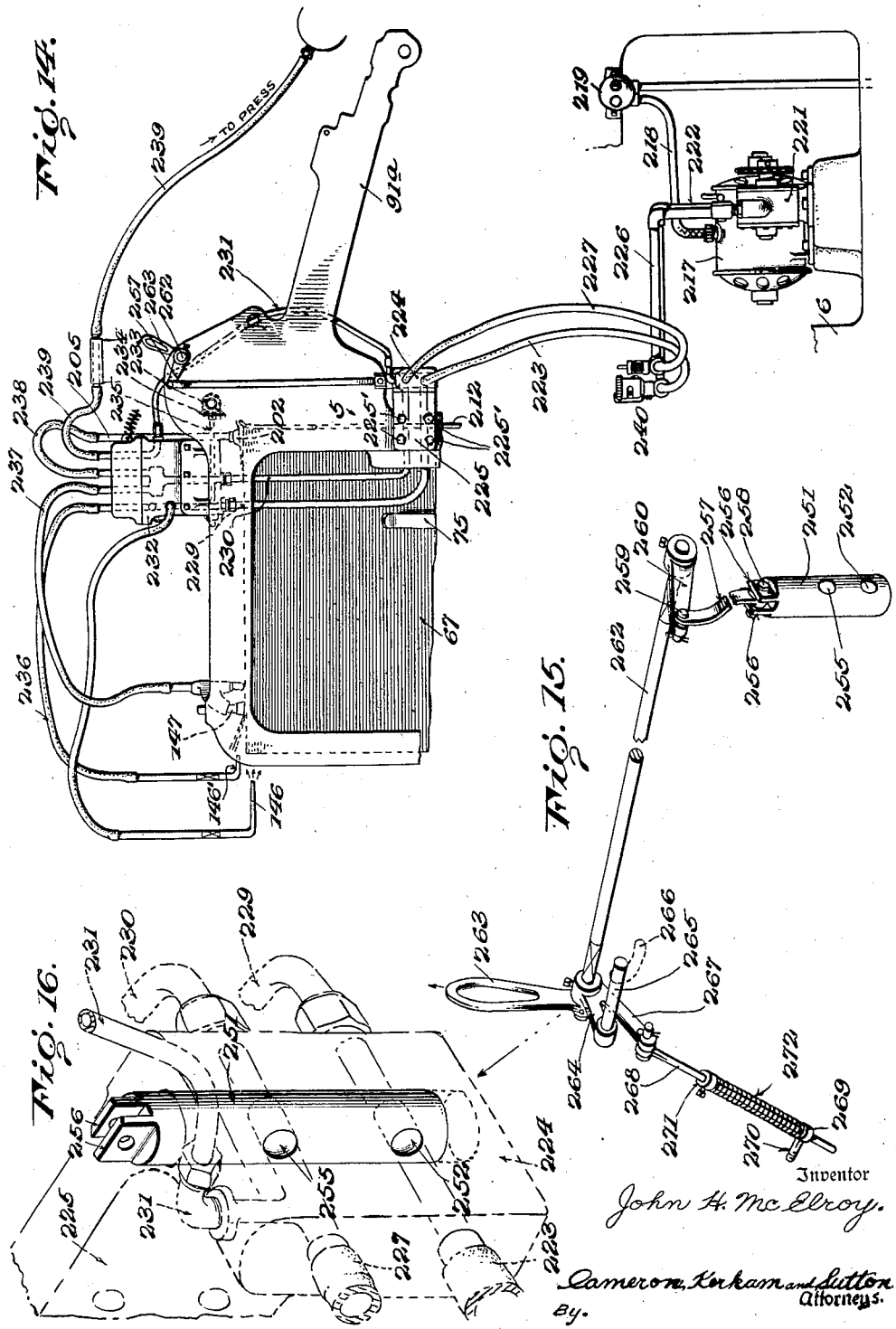

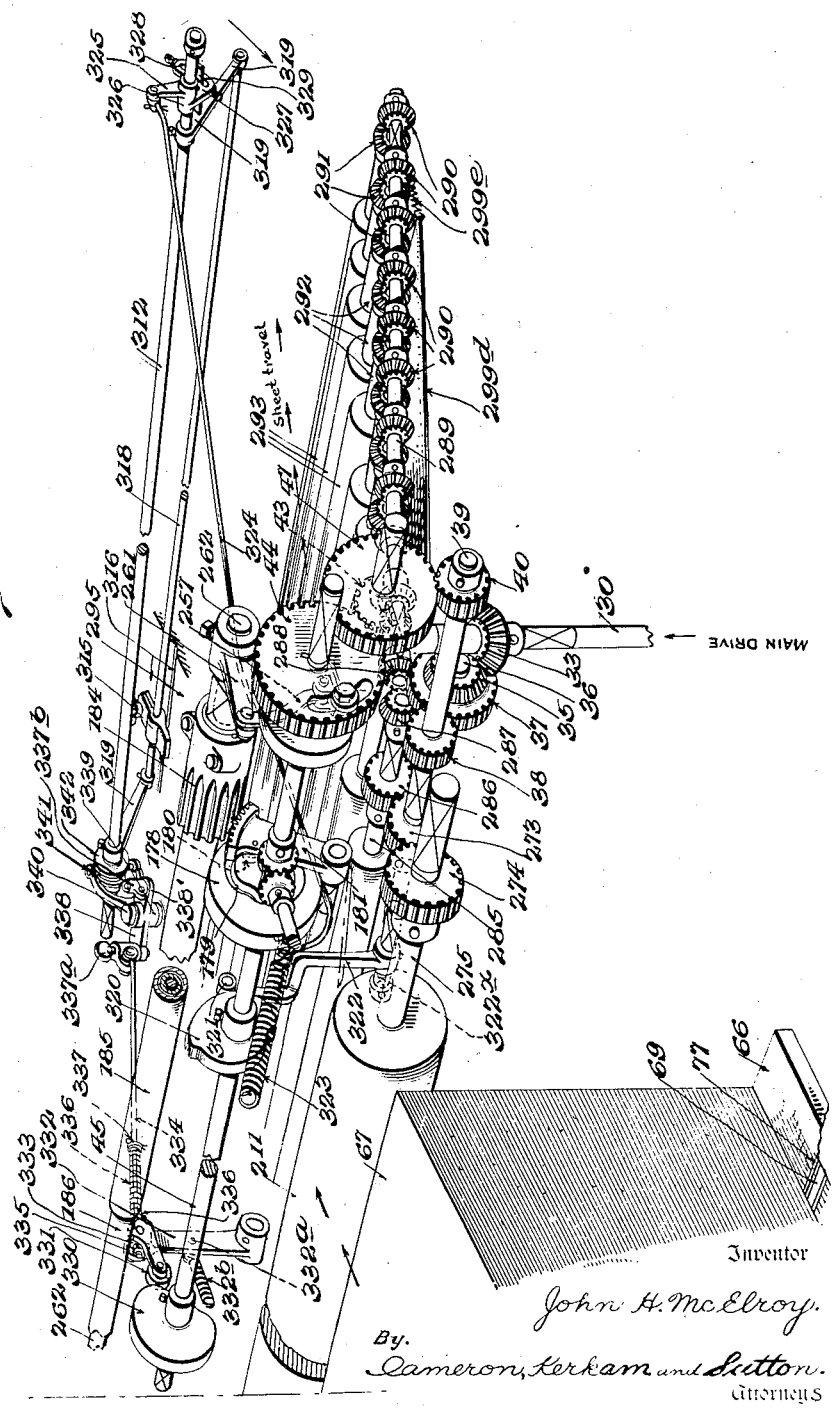

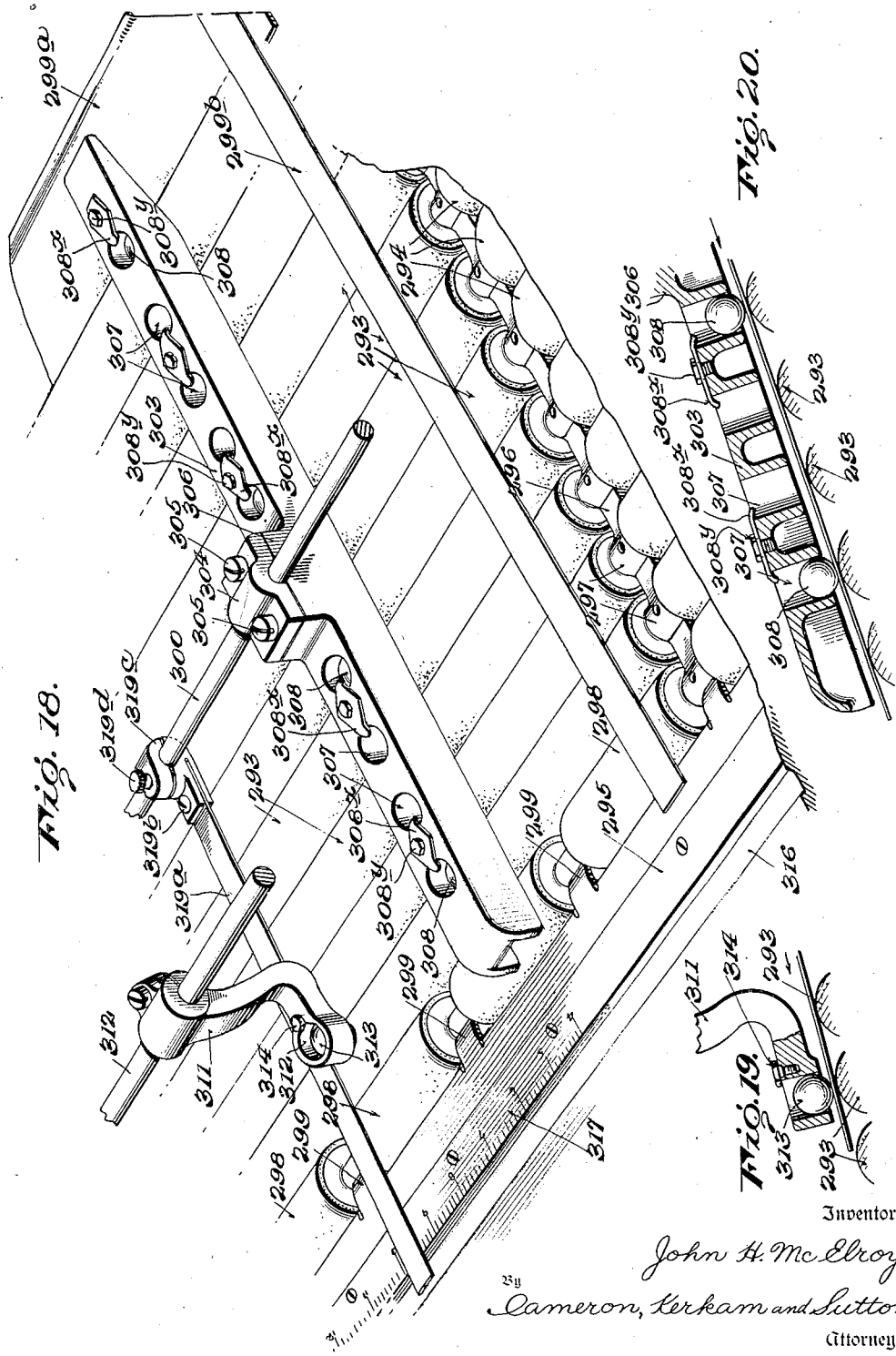

Patented July 17, 1934

1,966,900

UNITED STATES PATENT OFFICE 1,966,900

SHEET FEEDING DEVICE

John H. McElroy, Pearl River, N. Y., assignor to Dexter Folder Company, New York, N. Y., a corporation of New York Application July 22, 1929, Serial No. 380,078

69 Claims. (Cl. 271—31)

This invention is an improvement in sheet feeders for printing presses or for any other instrumentality with which the use of a sheet feeder is desirable.

One object of the invention is to provide a feeder that may be quickly loaded and adjusted for various sheet sizes so as to insure accurate and substantially continuous operation of the feeder.

Another object of the invention is to provide a feeder that does not require the attention of skilled mechanics for making the necessary adjustments incident to the use of the feeder.

Another object of the invention is to provide a feeder having pile engaging and guiding devices that insure positioning of the pile of sheets in the feeder in definite relation to instrumentalities that operate on the sheets.

Another object of the invention is to provide a feeder with sheet separating means adjustable to various operative positions and capable of being swung away to an inoperative position when it is desired to load the feeder or have access to parts within the same.

Another object of the invention is to provide a feeder having scales along which piling bars may be adjusted in accordance with the various widths of sheets to be handled by the feeder.

Another object of the invention is to provide a feeder having sheet deflecting means that prevents obstruction of the sheet as it travels forwardly in the feeder.

Another object of the invention is to provide a feeder having means whereby the pressure of the air delivered to sheet separating devices of the feeder may be regulated as desired.

Another object of the invention is to provide a feeder having improved valve mechanism for controlling the air and suction in sheet separating and sheet engaging devices of the feeder.

Another object of the invention is to provide improved driving connections for sheet engaging devices of the feeder, arranged so that said devices may be swung toward and away from the feeder without disturbing their driving connections and timed relation with the device to be fed by said feeder.

Another object of the invention is to provide a displaceable driving connection for sheet engaging devices of the feeder whereby said devices may be initially adjusted and set in timed relation with the printing press or other device to be fed.

Another object of the invention is to provide a feeder having improved auxiliary feed rollers co-operating with the main feed roller of the feeder.

Another object of the invention is to provide an improved arrangement of driven rollers for advancing the sheets from the feeder to the printing press or other devices to be fed.

Other objects of the invention will appear as the following description thereof proceeds.

In order to more clearly understand the invention, reference may be had to the appended drawings which illustrate one embodiment of the inventive idea and wherein:—

Fig. 1 is a detail perspective view of a feeder embodying the present invention, showing the same in an inoperative position relative to a printing press and arranged to swing toward and away from said press;

Fig. 2 is a side elevation of the feeder with parts omitted, showing the feeder swung toward the printing press into an operative position relative thereto;

Fig. 3 is a detail perspective view of an air escape valve for regulating the pressure of air delivered through a sheet separating device of the feeder;

Fig. 4 is a horizontal transverse sectional view through the air escape valve shown in Fig. 3;

Fig. 5 is a detail perspective view with parts omitted, of pile feeding means forming a part of the feeder;

Fig. 6 is a detail perspective view of driving connections for the pile feeding means and devices for operating said connections both automatically and manually;

Fig. 7 is a detail perspective view of a pivoted frame carrying sheet separating mechanism forming part of the feeder;

Fig. 7a is an enlarged top plan view, with parts omitted, of the sheet separating mechanism frame and a pile stop carried thereby;

Fig. 8 is a detail perspective view of driving connections for parts of the sheet separating means;

Fig. 9 is a fragmentary detail perspective view of a pile support for the feeder;

Fig. 10 is an enlarged detail perspective view of part of the pivoted frame for the sheet separating means, showing one of a pair of pivoted supports for said frame in an inoperative position;

Fig. 11 is a side elevation of the support illustrated in Fig. 10, the same being shown in its operative or supporting position relative to the pivoted frame;

Fig. 12 is a detail perspective view of driving connections for parts of the sheet separating means, the elements of said connections being shown separated for purposes of clearer illustration;

Fig. 13 is a detail perspective view of sheet forwarding means and auxiliary sheet feeding rollers of the feeder;

Fig. 14 is a fragmentary side elevation, with parts omitted, showing sheet separating and engaging devices and a manually operated valve controlling the air and suction thereto;

Fig. 15 is a detail perspective view of said valve and the operating means therefor;

Fig. 16 is an enlarged detail perspective view showing in full and dotted lines the valve and the housing therefor respectively;

Fig. 17 is a detail perspective view of driven sheet feeding rollers that carry the sheet forwardly from the feeder to the printing press or other device to be fed;

Fig. 18 is an enlarged detail perspective view of devices for retaining the sheet in engagement with the feed rollers shown in Fig. 17; and Figs. 19 and 20 are longitudinal sectional views through the sheet retaining devices shown in Fig. 18.

Referring to the drawings wherein like reference characters designate like parts throughout the several views, it is pointed out that the feeder of the present invention is shown, for purposes of illustration, associated with a flat-bed printing press and arranged to swing toward and away from the same. The feeder, however, is adapted for various other uses and purposes, may be otherwise arranged for movement toward and away from the device to be fed, and may, if desired, have a normally fixed position relative to said device.

Feeder mounting, Figs. 1, 2 and 5

In the particular embodiment of the invention illustrated in the drawings, the feeder is mounted on a frame 5 which is pivoted to one of the side frames 6, 6 of the printing press. The pivot for the feeder is preferably comprised by a vertical stationary shaft 7 carried in vertically spaced bosses 8, 8 that project laterally from one of the side frames 6, 6 of a printing press. The shaft 7 passes loosely through alined openings in a pair of arms 9, 9 rotatably engaged with the upper surfaces of the bosses 8, 8 and projecting laterally and forwardly from one side of the feeder frame 5 so that said frame and the various instrumentalities carried thereon may be swung toward and away from the printing press to operative and inoperative positions relative thereto. When the feeder is swung toward the press into operative relation therewith, said feeder is automatically locked to said press by a spring-pressed locking bolt 10. Said bolt is slidably mounted in a vertical opening extending through the forward end of a bracket 11 which is bolted or otherwise suitably secured to the side of the feeder frame 5 opposite that pivoted on the press frame work. The bolt 10 is normally urged downward by a flat spring 12 which, when the feeder is swung into the press, yields sufficiently to allow the bolt 10 to move upwardly over a keeper behind which the bolt is subsequently engaged. For this purpose the lower forward side of the bolt 10 is preferably beveled, as at 13, to pass over the keeper which, as herein shown, is preferably comprised by a lug 14 projecting upwardly from a bracket 15 that is bolted or otherwise suitably secured at the rear end of the press on the side frame thereof opposite that on which the feeder frame 5 is pivoted. The bracket 15 is provided adjacent the lug 14 with a guard 16 which, together with the adjacent side frame of the press, forms a guide that receives the bracket 11 when the feeder is swung into the press. During movement of bracket 11 in said guide, the spring bolt 10 rides up over the lug 14 and thereafter engages over said lug at the forward side thereof to hold the feeder locked to the press frame and in operative relation with the press. When it is desired to swing the feeder away from the press to an inoperative position, the bolt 10 is lifted manually whereupon said feeder may be swung about the pivot 7 to said inoperative position. To further aid in securing the feeder to the press, the side frames 6, 6 thereof are provided with openings 16a (Fig. 2) for the reception of bolts 16b that are slidably mounted in the ends of arms 91a extending forwardly from the feeder frame 5. These bolts are operated by racks 16c thereon and gears 16d meshing with said racks and fixed on a shaft 16e. This shaft is journalled in suitable bearings on the arms 91a and carries a disk 16f and a handle 16g for rotating said shaft to move the bolts 16b into and out of the opening 16a in the press frame 6, 6.

Feeder drive, Figs. 1, 2, 5 to 8 inclusive, 10, 13 and 17

The moving parts of the sheet engaging, feeding and control mechanisms of the feeder, are preferably driven from the printing press or other device with which the feeder is associated. In the particular embodiment of the invention herein illustrated, the drive for the various moving parts of the feeder is effected from an intermediate gear 17 (Fig. 2) which is rigidly secured in any suitable manner to the impression cylinder 18 of the printing press. Said cylinder is driven from any suitable source of power (not shown) and is journaled in suitable bearings in the side frames 6, 6 of the printing press. The gear 17 meshes with and drives a pinion 19 that is fixed on a shaft 20 journaled in suitable bearings in said side frames and carrying a bevel gear 21. The bevel gear 21 meshes with and drives a bevel gear 22 that is fixed on one end of a shaft 23 extending longitudinally of the press toward the rear thereof and journaled in suitable bearings 24, 24 on one of the side frames 6, 6 of said press. Fixed on the opposite end of the shaft 23 is a bevel gear 25 which meshes with a bevel gear 26 that is fixed on a short vertical driving shaft 27 journaled in a bearing 28 alined with the pivotal axis of the feeder frame 5 and formed on a bracket 29. This bracket 29 is bolted or otherwise pivotally secured to one of the side frames 6, 6 of the press and provides one of the bearings 24, 24 for the shaft 23.

Arranged in vertical alinement with the shaft 27 is a driven shaft 30 that is journaled in a suitable bearing 31 provided by a bracket 32 which is secured in any suitable manner to the feeder frame 5 and projects forwardly from the side thereof nearest the pivot 7. This driven shaft 30 is normally connected with the driving shaft 27, said driven shaft also being operatively, and preferably continuously, connected by mechanism hereinafter described, with a pile feeder, a sheet separator, a sheet forwarder, and sheet feeding rollers, all forming driven parts of the feeder proper and to be hereinafter described in detail.

In accordance with the present invention, an adjustable driving connection is provided between said driven parts of the feeder and the source of power for driving the same, and as herein shown said connection is preferably arranged between the driving shaft 27 and the driven shaft 30 and is preferably comprised by the following instrumentalities. Telescopically fitted on the opposed ends of the shafts 27 and 30 is a sleeve 32a (Figs. 2 and 6) provided longitudinally thereof with a keyway in which is slidably engaged a key 32b fixed on the shaft 30. The sleeve 32a is provided in its lower end with a suitable opening for a removable set screw (not shown) which is passed through said opening and engaged with the upper end of the driven shaft 27 when the feeder is shipped for installation. In order to set the driven feeder parts in proper timed relation with the printing press, said set screw is removed from the sleeve 32a and said sleeve is displaced longitudinally on the shaft 30 and the key 32b to disconnect the driving shaft 27 from the driven shaft 30. The driven parts of the feeder may then be set in proper timed relation with the printing press, whereupon the sleeve 32a is moved downwardly over the shaft 27 and a hole 32d (Fig. 5) is drilled in said shaft opposite the opening in said sleeve. A pin 32c (Fig. 2) is then inserted in the alined openings of the sleeve 32a and the shaft 27 and with said sleeve provides a driving connection between the shafts 7 and 27 and maintains the driven feeder parts in proper timed relation with the printing press.

Pile feeder, Figs. 1, 2, 5 and 6

The pile feeder is preferably operated, constructed, and controlled as follows. Fixed on the driven shaft 30 is a bevel gear 33, the hub 34 of which supports said shaft on the bearing 31. This bevel gear 33 meshes with a bevel gear 35 that is fixed on a stub shaft 36 journaled in a suitable bearing on one of a pair of arms 91a, 91a extending forwardly and downwardly from the feeder frame 5. Fixed on the stub shaft 36 is a spur gear 37 that meshes with a spur pinion 38 which is fixed on a shaft 39 journaled in suitable bearings on one of the arms 91a, 91a and extending transversely of the feeder. Fixed on the outer end of the shaft 39 is a spur pinion 40 which meshes with a spur gear 41 that is fixed on a stub shaft 42.

This shaft 42 is journaled in suitable bearings on the arm that carries the shaft 39, and fixed on the shaft 42 is a spur pinion 43 which meshes with a spur gear 44 that is fixed on a shaft 45. The shaft 45 extends transversely of the feeder and is journaled in suitable bearings on the arms 91a, 91a. Mounted loosely on the shaft 45 is a cam 46 which is rigidly connected with the spur gear 44, as by a pin and slot connection 47, 48 that provides for angular adjustment of said cam on said shaft. The cam 46 is adapted to engage a roller 49 carried by an arm 50 which is fixed on a rockshaft 51 journaled in suitable bearings on one side of the feeder frame 5 and operated by engagement of said cam with said roller. Fixed on the rockshaft 51 is an arm 52 the free end of which is pivotally connected with one extremity of a link 53. The opposite extremity of the link 53 is pivotally connected with a pawl carrying arm 54 loosely mounted on a shaft 55 extending transversely of the feeder frame 5 and journaled in suitable bearings on the opposite sides of said frame near the top thereof. Pivoted on the free end of the arm 54 is a pawl 56 which is adapted to engage a ratchet 57. Said ratchet is loosely mounted on the shaft 55 between one side of the feeder frame 5 and a clutch member 57' fixed on said shaft. The ratchet 57 is provided with a clutch member 57" normally engaging the clutch member 57' and acting therethrough to drive the shaft 55 when the ratchet 57 is turned in one direction by the pawl 56. Turning movement of the ratchet in the opposite direction is prevented by a pawl 57''' that engages the teeth of the ratchet and is pivoted on one side of the feeder frame 5.

Fixed on the shaft 55 are worms 58, 58 which mesh with worm gears 59, 59 which are rigidly secured on the front ends of a pair of shafts 60, 60 disposed transversely of the shaft 55 and journaled in suitable bearings on the opposite sides of the feeder frame 5 near the top thereof. Each of the shafts 60, 60 has fixed thereon in spaced relation a pair of sprockets 61, 61 around which pass chains 62, 62 arranged vertically in pairs at opposite sides of the feeder frame. The chains 62, 62 also pass around sprockets 63, 63 fixed in spaced relation on shafts 64, 64 disposed parallel with and vertically below the shafts 60, 60 and journaled in suitable bearings on the opposite sides of the feeder frame 5 near the bottom thereof. The conveyor chains 62, 62 run over suitable guides (not shown) and are provided at intervals therealong with horizontal flights 65, 65 adapted to receive and support a pile board 66 for a pile of sheets 67 placed on said board and moved therewith into the feeder to be fed upwardly thereby during the operation of the machine. The rear ends of the flights 65, 65 are provided with stops 65', 65' which prevent the pile board 66 from being accidentally displaced rearwardly from said flights. These stops are preferably formed by cutting into and turning up a portion of the rear end of each flight so that said portion projects angularly from the flight and provides a pile board stop 65' such as shown in Fig. 5 of the drawings.

Any suitable means may be employed to automatically control the upward feeding of the pile of sheets 67 by the conveyor chains 62, 62 but as herein shown said means is preferably of the type disclosed in application Serial No. 158,770, C. E. Christophel, filed January 3, 1927. This control mechanism (Fig. 6) includes a detector 67a and a control member 67b, automatically controlling the drive for the pile feeder elevating mechanism. The detector 67a is continuously moved toward and away from the pile 67 and when a sufficient number of sheets have been fed off the top of said pile the detector lowers sufficiently to disengage a hook 67c from a projection 67d on the control member 67b. The control member is then urged forwardly by a spring 67e so that the roller 49 follows the cam 46 which then acts on said roller to operate the drive for the pile feeder and lift the pile of sheets. When the sheets are lifted to the proper height, the detector 67a is also lifted and acts through its shaft 67f and an arm 67g thereon, to pull a spring 67h and swing a lever 67i upwardly to reengage the hook 67c carried thereby with the notch 67d on the control member 67b. The roller 49 is thus prevented from following the cam 46 so that the drive for the pile feeder is no longer operated. The cam 46, however, intermittently engages the roller 49 and acts, together with the spring 67e, to raise and lower the detector 67a while the drive for the pile feeder is inoperative. When the drive for the pile feeder is operating, the hook 67c, which at this time is disengaged from the projection 67d, is acted upon by a cam 67k on the control member 67$^b$, said cam and the spring 67$^h$ acting to raise and lower the detector 67$^a$ respectively, during the operation of the pile feeder drive. The cam 67$^k$ is formed on the control member adjacent a cam portion 67$^x$ thereof that rides on a pin 67$^y$ secured to the feeder frame 5 and acting to prevent excessive downward movement of said control member. Excessive upward movement of the lower end of lever 67$^l$ is prevented by a pin 67$^z$ that projects over said lever from the feeder frame 5 and is secured thereto in any suitable manner.

The feeder is provided with means for manually raising and lowering the pile of sheets, and as herein shown said means is preferably constructed and operated as follows. Loosely mounted on one end of the shaft 55 is a handle 67$^l$ (Figs. 1, 5 and 6) the hub of which is provided with a cam groove 67$^m$ closed at one end and having a laterally opening opposite end faced toward one side of the feeder frame 5. When it is desired to raise the pile of sheets by hand, the handle 67$^l$ is moved on the shaft 55 so that a roller 67$^n$ journaled on and extending radially from said shaft engages in the open end of the cam groove 67$^m$. The handle is then engaged with said side of the feeder frame 5 and turned in a counter direction from the left of Fig. 6, and indicated by the arrow therein, and through the engagement of the roller 67$^n$ in the open end of the cam groove 67$^m$, the shaft 55 is turned in the same direction, thus rotating the worms 58, 58 and the worm gears 59, 59 so that the conveyor chains 62, 62 are operated to raise the support 66 and the pile of sheets 67 thereon. During rotation of the shaft 55 in the direction stated, it has a slight endwise movement in its bearings on the frame 5, which movement is produced in one direction by a spring 67$^p$ and in the opposite direction by riding of the clutch member 57' over the clutch member 57'' that remains stationary when the shaft 55 is rotated by the handle 67$^l$. The worms 58, 58 thus have a slight axial movement as they drive the worm gears 59, 59, and the roller 67$^n$ moves laterally in the open end of the cam groove 67$^m$ which, for this purpose, is somewhat wider than the diameter of said roller to permit it to slide back and forth in the open end of the cam groove during relative movement of the clutch members 57', 57''. Fixed on the shaft 55 is a collar 67$^o$ against which bears one extremity of the spring 67$^p$. The spring 67$^p$ is mounted on the shaft 55 and the opposite extremity of said spring bears against one side of the feeder frame 5 on the inner face thereof. This spring 67$^p$ tends to move the shaft 55 to the right (Fig. 6) and maintain the clutch members 57', 57'' in engagement.

When it is desired to lower the pile support 66 by hand, the handle 67$^l$ is engaged with the roller 67$^n$ and the side of the feeder frame 5, as before described. The handle 67$^l$ is then turned in a clockwise direction as viewed from the left of Fig. 6, thereby turning the shaft 55 in the same direction and rotating the worms 58, 58 and the worm gears 59, 59 so that the conveyor chains 62, 62 are operated to lower the pile support. When the handle 67$^l$ is first turned to lower the pile support, the cam 67$^m$ in said handle acts on the roller 67$^n$ to move the shaft 55 to the left, separate the clutch members 57', 57'', and slide the worms 58, 58 slightly on the worm gears 59, 59. The spring 67$^p$ is thus compressed, and during rotation of the shaft 55 to lower the pile support, said clutch members are maintained out of engagement by the action of the cam 67$^m$ on the roller 67$^n$. After the pile support has been lowered by the handle 67$^l$, the same is disengaged from the roller 67$^n$, whereupon the spring 67$^p$ moves the shaft 55 to the right and reengages the clutch members 57', 57'' so that the pile support may then be elevated automatically as previously described.

*Pile support, Figs. 2 and 5 to 7 inclusive*

The pile support 66 is preferably moved to operative and inoperative positions relative to the feeder through the rear side thereof which is open for this purpose, and in accordance with the present invention said support is provided with means whereby a pile of sheets of any desired width and length may be placed thereon centrally to occupy a definite or predetermined position with respect to the sheet separating and sheet forwarding mechanisms hereinafter described. Said means is preferably constructed and operated as follows. The pile board 66 is provided forwardly and at opposite sides thereof with spaced slots 68 (Fig. 5) extending parallel with the adjacent forward edge of said board. Each of the slots 68, 68 has fitted therein the reduced portion 69 of an upwardly opening, channel-shaped member the enlarged portion 70 of which is provided with laterally extending flanges 71, 71 secured in any suitable manner to the board 66 on the under side thereof.

Fitted in the enlarged portion 70 of each of these channel-shaped members, is the head 72 of a bolt 73 (Fig. 2) which extends upwardly through the reduced portion 69 of the channeled member and receives the horizontal base or arm 74 of a piling bar 75. The horizontal base or arm 74 is provided with a suitable opening through which the upper threaded end of the bolt 73 projects, and screwed on said end of the bolt is a wing nut 76 which can be loosened to provide for adjustment of the piling bar along the channel-shaped member. Thereafter said wing nut is tightened to secure said piling bar in the desired position of adjustment on the board 66. The upper edges of the reduced portions 69, 69 of the channel-shaped members or guides, are provided with scales 77, 77 the inner ends of which are spaced apart a distance equal to the width of the smallest size sheet which it is desired to handle in the feeder. The inner ends of the scales are equidistant from the opposite sides of the pile board 66 and if, for example, the width of the smallest sheet to be handled in the machine is eight inches, the numeral 4 will be placed adjacent the inner end of each scale. The distance between the outer ends of the scales 77, 77 is equal to the width of the largest size sheet which is desired to handle in the machine and if said width, for example, is thirty inches, the numeral 15 will be placed opposite the outer ends of each of said scales. Between the inner and outer ends of the scales, the graduations thereof are preferably provided opposite the same with numerals 5 to 14 for sheets progressively increasing in width from ten to twenty-eight inches.

When it is desired to feed a pile of sheets of a given width, the attendant adjusts the piling bars 75, 75 along the scales 77, 77, then secures the piling bars in their adjusted position by tightening the wing nuts 76, 76, and thereafter places the pile of sheets on the piling board between said piling bars and in engagement therewith. If, for example, it is desired to feed a pile of sheets twenty inches wide, each piling bar will be moved along the scale to the numeral 10 and there secured in position, whereupon the pile of sheets will be placed upon the board between said bars as above described. In the present machine, the sheet separating mechanism is adjustable laterally and longitudinally of the feeder in accordance with sheets of various dimensions and after the pile is run into the feeder, said mechanism is set in proper position on the feeder to operate on the corner and top of the pile of sheets. The sheet forwarding mechanism, however, is mounted centrally of the pile feeder and is not adjustable laterally thereof. Therefore, when the pile of sheets is placed centrally on the pile board as above described and run into the machine by guide means to be presently described, the pile of sheets will have a definite position in the feeder relative to the sheet separating mechanism and the sheet forwarding mechanism, such that the former will always act on the rear of the sheet and the latter will always engage the front of the sheet centrally of its forward edge.

*Pile support guiding and positioning means, Figs. 2, 5, 7 and 9*

In accordance with the present invention, means are provided for guiding the pile support 66 into the feeder and for holding said support and the pile of sheets in position thereon against lateral displacement relative to the feeder. Said means are preferably constructed and operated as follows. Mounted on the bottom of the pile feeder frame 5, and movable therewith toward and away from the press or other device to be fed, are tracks 78, 78 that extend in spaced parallel relation with each other and with the shafts 60, 60 and 64, 64 of the pile feeder. The pile support 66 is provided with cross members 79, 79, one of said cross members being secured to the channel shaped members 70, 70 and the other cross member being secured to a spacing element 80 which in turn is secured to the pile support 66 on the bottom thereof. The cross members 79, 79 are thus spaced equal distances from the bottom of the pile support 66 and said cross members are provided with spaced grooves 81, 81 and opposite, tennoned ends 82, 82 (Fig. 9). When the pile of sheets has been placed on the pile board 66 as above described, said board with the pile thereon is run, as by a truck 83 (Fig. 2), up to the feeder so that the grooves 81, 81 of the cross members 79, 79 are alined with the tracks 78, 78. The pile board 66 with the pile of sheets thereon is then pushed off the truck 83 into the feeder, the grooves 81, 81 engaging the tracks 78, 78 and the tennoned ends 82, 82 of said cross members extending over the tops of a pair of the flights 65, 65 of the pile feeder. When the feeder is operated, said tennoned ends engage said pair of flights so that the pile 67 is fed in the feeder and prevented from being laterally displaced relative thereto. When the pile of sheets has been fed upwardly by said feeder to a point where the supply of sheets is exhausted or nearly so, another piling board constructed in accordance with the present invention and carrying a supply of sheets placed thereon as before described, may be run into the feeder so as to be engaged with and elevated by another pair of the flights, 65, 65. The first board is then removed from the feeder by sliding the same outwardly along the adjacent flights 65, 65, whereupon a new supply of sheets may be placed on said board as before and the same run into the feeder as above described. When a pile board such as above described is to be run into the feeder in the manner stated, the pair of the flights 65, 65 that are to carry the board may be moved to a position slightly below the cross members 79, 79 so that the same will clear the stops 65', 65' on said pair of flights. When the pile board and the pile of sheets thereon is run into the feeder, the tennoned ends 82, 82 on the rearmost of the cross members 79, 79 drop behind the stops 65', 65' on said pair of flights and it will thus appear that said stops prevent said board and the pile of sheets thereon from being accidentally displaced rearwardly of the feeder. When the pile board is to be removed, the rear edge thereof is lifted slightly to clear the stops 65', 65' on the pair of flights, whereupon the board is drawn rearwardly, lifted over said stops, and completely removed from the feeder.

*Sheet separating mechanism, Figs. 1, 2 and 7 to 12, inclusive*

The sheet separating mechanism per se is preferably of the type disclosed in Patent No. 1,475,621, C. E. Christophel, November 27, 1923, and is mounted on the pile feeder to swing therewith toward and away from the printing press or other device to be fed. In accordance with the present invention, however, the sheet separating mechanism is also arranged to swing as a unit toward and away from the pile feeder to operative and inoperative positions relative thereto and said sheet separating mechanism is provided with improved means for adjusting and driving the same.

Referring more particularly to Figs. 7, 8, 10 and 12, the driven shaft 30 extends upwardly beyond its bearing 31 on the feeder frame 5 and is provided at its upper end with a reduced portion 84 and a shoulder 85. Telescopically fitted on the reduced shaft portion 84 and normally seated on the shoulder 85, is one element 86 of a universal coupling. The element 86 is provided interiorly thereof with a key 87 which engages a groove 88 in the shaft portion 84 so that the element 86 is secured to the shaft 30 to rotate therewith but may under certain conditions slide along said shaft. The element 86 is connected, as by cross-pins 89, 89 with another element 90 of the universal coupling, the pins or pivots for said coupling normally being disposed in substantially the same horizontal plane in which is located the pivot for a swinging frame hereinafter described. The pivot for said frame is preferably comprised by a shaft 91 (Fig. 1) which extends transversely of the feeder frame 5 and is journaled in a tube 277ˣ fixed on the inner ends of the arms 91ª, 91ª (Fig. 1) that are secured to or formed integrally with the feeder frame 5 and project forwardly and downwardly from the same. The swinging frame is preferably comprised by a pair of brackets 92, 92 that are fixed on the shaft 91 and extend toward the rear of the feeder frame 5. Extending rearwardly from the brackets 92, 92 are the side members 93, 93 of said swinging frame and mounted on said side members and adjustable longitudinally and laterally of the feeder by mechanism hereinafter described, is the sheet separating mechanism above referred to.

The universal coupling element 90 is telescopically fitted over the reduced lower end portion 94 of a stub shaft 95 (Fig. 10), said element 90 being provided therein with a key 96 which engages in a groove 97 of the shaft portion 94 so as to drive the shaft 95 from the shaft 30 and provide for sliding movement of the element 90 along the shaft portion 94 under certain conditions. The shaft 30, the universal coupling 86, 90, and the stub shaft 95 are normally disposed in vertical alinement, the element 90 bearing against a collar 98 on the stub shaft 95 and said stub shaft being journaled in a suitable bearing 99 on one of the brackets 92, 92. It will thus appear that when the frame 93, 93 is swung up or down about its pivot 91, the elements 86 and 90 and the shafts 30 and 95 have a relative sliding movement such that the driving connection between said shafts is maintained during the swinging movement of said frame and in any position of the same. The shaft 95, as hereinafter described is continuously connected with driven parts of the sheet separating mechanism so that regardless of the position of the frame 93, 93 said parts are continuously connected with the shaft 30 and continuously maintained in timed relation with the printing press. For this purpose, there is fixed on the upper end of the shaft 95, a bevel gear 100 the hub 101 of which bears on the upper surface of the bearing 99 and acts together with the collar 98 to prevent endwise displacement of the stub shaft 95. This bevel gear 100 meshes with a bevel gear 102 that is fixed on the forward end of a shaft 103 extending substantially at right angles to the stub shaft 95. The forward end of the shaft 103 is journaled in suitable bearings 104, 104 on the bracket that carries the stub shaft 95. The rear end of the shaft 103 is journaled in a suitable bearing provided by an arm 105 (Fig. 7) fixed on the rear end of one of the side frame members 93, 93. This shaft 103 serves to drive the moving parts of the sheet separating mechanism through the medium of the following devices.

Keyed to and slidable along the shaft 103 is a bevel gear 106 which is arranged in a housing 107 through which the shaft 103 loosely extends. The housing 107, which is also slidable along the shaft 103, is fixed on a bracket 107' secured to one end of a cross member 108 that carries the sheet separating mechanism and along which the same may be adjusted to various positions. The gear 106 meshes with a similar gear 109 arranged in the housing 107 and fixed on one end of a shaft 110 that extends transversely of the pile feeder frame 5 and in substantially parallel relation with the cross member 108. The end of the shaft 110 carrying the gear 109 is journaled on the housing 107, the opposite end of said shaft being journaled in a bearing 111 carried by a bracket 112 secured to the cross member 108 at the end thereof opposite that carrying the bracket 107' and the housing 107. Keyed to and slidable along the shaft 110 is a bevel gear 113 (Fig. 8) which is arranged in a housing 114 that is also slidable along the shaft 110 and through which the latter loosely extends. This housing 114 is bolted or otherwise suitably secured on the top of a bracket or carriage 115 which carries the sheet separating mechanism.

The bracket 115 is mounted on the cross member 108 for sliding movement along the same, and said bracket may be secured in any desired position on said cross member by a set screw 116. The bevel gear 113 meshes with a bevel gear 117 which is fixed on the upper end of a vertical stub shaft 118 (Fig. 8) that is journaled in a suitable bearing in the top of the bracket 115. Fixed on the stub shaft 118 is a spur gear 119 which meshes with a spur gear 120 rotatably arranged on the top of a projection 121 (Fig. 1) of the bracket 115 and retained by suitable means against vertical displacement relative to said bracket. Keyed to and slidable through the gear 120 is a shaft 122 provided at its upper end with a collar 123 for preventing displacement of said shaft from the bracket 115. Arranged in spaced relation with the projection 121, and extending forwardly from the bracket 115, is a projection 124 (Fig. 1) in a suitable opening of which is slidably mounted a vertical guide 125 (Fig. 8). The upper end of the guide 125 is threaded to receive an adjusting nut 126 which bears on the top of the projection 124 and serves to raise and lower said guide and the hereinafter described parts carried thereby, relative to the swinging frame 92, 92, 93, 93, 108. Fixed on the lower end of the guide 125 is a web-like casting 126 that is also fixed on the lower end of the shaft 122 and the guide 127. The guide 127 extends upwardly through a suitable opening in a projection 128 (Fig. 1) which is spaced from the projection 124 and extends forwardly from the bracket 115.

Fixed on the lower end of the shaft 122 is a bevel gear 129 (Fig. 8) that meshes with a bevel gear 130 rigidly secured to a horizontal shaft 131. This shaft 131 is journaled in bearings 132 and 133 on the opposite ends of the casting 126, and fixed on said shaft adjacent the bevel gear 130 is a spur gear 134. This spur gear 134 acts through a series of intermeshing gears 135, 136, 137, to drive a rotary platen or sheet separator 138 constructed and operating on the corner of the pile of sheets as described in the patent to C. E. Christophel, above referred to. The rotary platen and the series of gears for driving the same are journaled on a bracket 139 (Fig. 2) loosely mounted on the shaft 131 so that said platen and gears may be swung upwardly and retained in an inoperative position by a hook 140 engageable with a stationary part of the machine. Fixed on the shaft 131 is a bevel gear 141 that meshes with a bevel gear 142 rigidly secured on one end of a shaft 143. This shaft 143 carries at its opposite end a combing wheel 144 and is journaled in a suitable bracket (not shown) loosely mounted on the shaft 131 and engageable with the bracket 139 so that the combing wheel may be swung upwardly to an inoperative position with the platen 138. The casting 126 carries a blow pipe 146, a hollow foot clamp 146', and a suction sheet separating device 147. These devices are constructed and operated as disclosed in the patent to Christophel above referred to, and since they form no part of the present invention it is unnecessary to describe the same in detail. The air in the blow pipe 146 and the foot clamp 146', and the suction in the sheet separator 147 are, however, controlled by means forming part of the present invention and which will be hereinafter described in detail.

The sheet separating mechanism, as before described, is slidable as an entirety along the cross member 108 so that when a pile of sheets of a given width is to be handled in the machine, the sheet separating mechanism may be moved along the cross member to a point where said mechanism will engage the sheets to be separated. While a single sheet separating mechanism is herein illustrated and described, two sheet separating mechanism could be employed in conjunction with opposite corners of a pile of sheets on the pile board 66, each of said mechanisms being identical in construction and operation and slidable along the cross member 108. Any suitable means may be provided for adjusting the sheet separating mechanism along the cross member 108, but as herein disclosed, the sheet separating mechanism is preferably adjusted manually along said cross member and secured in the desired position by the set screw 116.

It also is desirable to adjust the sheet separating mechanism longitudinally of the feeder whereby sheets of various lengths can be handled therein. In accordance with the present invention, means are provided for making such longitudinal adjustments of the sheet separating mechanism. This linear adjusting means is preferably constructed and arranged as follows. Journaled in suitable bearings on the brackets 107' and 112, is a shaft 149 (Fig. 7) having fixed to or formed integrally therewith pinions 150, 150 which mesh with racks 151, 151 secured to or formed integrally with the frame members 93, 93. This shaft 149 is provided at its opposite ends with operating handles 152, 152, which, when turned to rotate the shaft 149, act through engagement of the pinions 150, 150 with the racks 151, 151 to move the cross member 108, the sheet separating mechanism carried thereby, and the shaft 149 as a unit along the frame members 93, 93.

In accordance with the present invention, means are provided for automatically positioning the sheet separating mechanism with respect to the pile of sheets to be acted upon by said mechanism. Said means is preferably comprised by a stop 153 (Figs. 1, 2 and 7) adjustably mounted on the cross member 108 and engageable with the rear of the pile of sheets 67, and a stop 153' mounted on the separating mechanism bracket 115 and engageable with one side of the pile of sheets. When the sheet separating mechanism and the cross member 108 are moved along the frame members 93, 93, the stop 153 is also moved therewith and engages the rear of the pile of sheets and automatically positions said mechanism longitudinally of the pile. When the sheet separating mechanism is moved along the cross member 108, the stop 153' is also moved therewith and engages one side of the pile of sheets and thereby automatically positions said mechanism laterally with respect to said pile. A pile stop 153" may be adjustably mounted on the cross member 108 to engage the side of the pile opposite that engaged by the stop 153'. When a second sheet separating mechanism is used, the pile stop 153" will preferably be secured to the frame thereof so that said mechanism may be automatically positioned with respect to the pile by said stop 153" and the stop 153. A roller 153''' adjustably mounted on the cross member 108, may also be employed to engage the corner of the pile of sheets opposite that acted upon by the sheet separating mechanism.

Referring to Fig. 7a, the stop 153' is mounted on a stud 115ª carried in and projecting laterally from an apertured ear 115ᵇ formed integrally with the bracket or carriage 115 and extending downwardly therefrom. The stop 153' is retained on said stud against a shoulder 115ᶜ thereof, by a cotter pin 115ᵈ which extends through a suitable opening in the stud. The stud 115ª is provided with two spaced grooves 115ᶠ and 115ᵍ in either of which may be engaged a set screw 115ʰ having threaded engagement with the walls of an opening formed in the ear 115ᵇ. When separating cardboard stock or the like, the platen 138 and associated parts are generally shifted outwardly and held in an inoperative position and only the suction separator is employed to separate said stock. In this event, the stud 115ª and the stop 153' are moved to the full line positions thereof as shown in Fig. 7a and there held by engagement of the set screw 115ʰ in the groove 115ᶠ. When ordinary paper stock is to be separated, the stud 115ª and the stop 153' are moved to the dotted line positions thereof shown in Fig. 7a and there retained by engagement of the set screw 115ʰ in the groove 115ᵍ. The rotary platen 138 is positioned to separate or lift the corner of the pile of sheets when the sheet separating mechanism is shifted inwardly in proper position with respect to the pile. It will of course be understood that the stops 153 and 153' automatically position the sheet separating mechanism with respect to the pile under all the operating conditions above set forth.

When a pile of sheets is to be fed, the sheet separating mechanism and the swinging frame carrying the same may be moved upwardly to an inoperative position so that the pile of sheets can be run into the feeder to an operative position thereof. In accordance with the present invention means are provided for holding the sheet separating mechanism and said frame in an inoperative position and for thereafter facilitating movement of the same to an operative position. Said means are preferably constructed and operated as follows. Secured to or formed integrally with the frame members or brackets 92, 92 are pins 154, 154 (Figs. 7, 10 and 11) that project laterally into guides formed in swinging supports 155, 155, each pivoted as at 156 on one side of the feeder frame 5 near the top thereof (Fig. 1). The guide on each of the supports 155, 155 is preferably formed by laterally spaced, straight wall portions 157, 158 (Fig. 11) and a curved wall portion 159 joining said straight wall portions and having a configuration such that the guide increases in size from the pivot end of the support 155 to the free end thereof. Said wall portions of the guide project inwardly from one side of the pivoted support so that the outer side of the guide is closed by the support and the inner side of said guide is open to receive one of the pins 154, 154. The guide is provided intermediate its opposite ends with a notch 160 that extends between the straight guide wall portions 157, 158 and is faced inwardly toward the large end of said guide. Projecting from each of the supports 155, 155 into the enlarged end of its guide is a cam or lug 166 that is spaced from the walls of the guide and disposed substantially in line with the pivot 156 and to one side of the straight guide wall portion 158. Each of the supports 155, 155 is provided adjacent the notch 160 with an outwardly extending projection 167 on which is pivotally mounted, as at 168, a pawl or lever 169. The pawl or lever 169 projects into the guide through a suitable opening in the straight wall portion 157 thereof, and said pawl is normally urged by a spring 170 into engagement with the cam or lug 166. The spring 170 is secured to the support 165 by machine screws 171, 171, and said spring is preferably of the leaf type and has a curved free end 172 that engages the pawl or lever 169 adjacent the pivot 168 thereof.

In the normal position of the swinging frame 93, 93, the free end thereof rests on lugs 173, 173 (Fig. 7) that project upwardly from the sides of the feeder frame 5 at the top and rear of said frame. In this position of the swinging frame 93, 93, each of the supports 155, 155 is gravitationally held against the pin or stop 154, which assumes a position in the end of the guide adjacent the pivot 156, as indicated in dotted lines in Figs. 10 and 11. Each of the supports 155, 155, may, if desired, have a projection 175 that provides an extra gravitational force to bring the supports 155, 155 into contact with pins 154, 154.

When it is desired to render the pile feeder inoperative, the frame 93, 93 is swung upwardly to move the sheet separating mechanism as a unit from its operative position to an inoperative position. As the frame 93, 93 is swung upwardly, the pin 154 travels along the guide wall portion 158 and swings the support 155 upwardly. When the pin reaches the end of the guide wall portion 158 adjacent the notch 160, the support 155 swings downwardly a short distance thus engaging the pin 154 in the notch 160 so that the frame 93, 93 and the sheet separating mechanism carried thereby are supported by the member 155 in a raised, inoperative position. If the frame 93, 93 is raised too quickly, so that the pin 154 engages the cam or projection 166, said cam or projection will act to swing the support 155 so that said pin is engaged in the notch 160 as before described. The frame 93, 93 is thus locked automatically in its raised, inoperative position and cannot be accidentally displaced therefrom.

When it is desired to move the frame and the sheet separating mechanism to the normal operative positions occupied thereby, the frame is first lifted to a second inoperative position and then lowered to its operative position. As the frame is lifted from its first inoperative position, the pin 154 strikes the pawl or lever 169 which is thus disengaged from the cam or projection 166, allowing the pin 154 to pass between said cam and said pawl or lever. At the instant the pin 154 passes the pawl or lever 169, however, said pawl is reengaged, by the spring 170, with the cam or lug 166. The frame can now be lowered to its operative position and during this movement of the frame, the pin 154 engages the end 176 of the pawl 169 and the surface 177 of the cam or lug 166 so that the support 155 moves slightly to the right as viewed in Fig. 11. The pin 154 is thus prevented by the pawl 169 and the cam 166, from reengaging in the notch 160 as the frame 93, 93 and the sheet separating mechanism are lowered to their operative positions. After the pin 154 passes off the cam surface 177, it travels toward the smaller end of the guide, the support 155 at the same time having a lowering movement substantially at the time the frame 93, 93 engages the lugs 173, 173.

*Sheet forwarding mechanism and sheet deflecting means, Figs. 1, 5, 13 and 17*

The sheet forwarding mechanism is preferably of the suction type, and in the present machine said mechanism is mounted above and preferably centrally of the pile feeder to engage the sheet near the forward edge and at the center thereof. The sheet forwarding mechanism herein illustrated has substantially the same construction and operation as the sheet forwarding mechanism disclosed in Patent No. 1,584,734, granted to C. E. Christophel, May 18, 1926. Fixed on the shaft 45 is a cam 178 (Figs. 13 and 17) in the cam groove 179 of which is engaged a roller 180. This roller is journaled on an arm 181 that is loosely mounted on a stud 182, projecting from one of the arms 91ª, 91ª on the feeder frame 5. Secured to or formed integrally with the free end of the arm 181, is a segmental gear 183 that meshes with a pinion 184 that is fixed on a tube 185. The tube 185 is loosely mounted on a fixed tubular stay shaft 186 which extends transversely of the feeder and is secured to the arms 91ª, 91ª. Fixed on the tube 185 so as to be oscillated therewith by the gear 183 and pinion 184, is an arm 187 that oscillates and reciprocates a bell crank lever one arm 188 of which is pivotally connected to the arm 187. Said bell crank lever is pivotally mounted, as at 189, on a carriage 190 which, through the arm 188 and the arm 187 is reciprocated along a substantially horizontal track 191. The track 191 is fixed on the tubular stay shaft 186 substantially at the center of the feeder and in overhanging relation with the forward side of the pile of sheets carried thereby. The other arm 198 of the bell crank lever is provided with a cam 198' that engages a roller 199 journaled on a lever 200. The lever 200 is pivoted, as at 201, on the carriage 190 and during reciprocation of said carriage, the lever 200 is raised and lowered to impart like motion to the suction sheet forwarder 202, 202. For this purpose, the lever 200 is provided with a forked end 203 which engages the under side of a collar 204 that is fixed on a pipe 205 mounted for vertical sliding movement in apertured portions of brackets 206 and 207 carried by the carriage 190. Fixed on the lower end of the tube 205 is a Y-shaped tube 208 the downwardly turned ends of which carry the suction sheet forwarder 202, 202. In order to prevent turning movement of the tube 205 and the suction sheet forwarder, the Y-shaped tube 208 is provided with a vertical guide member 209 that is guided in a suitable slot 210 formed in the bracket 207.

During the operation of the machine, the sheets of the pile 67 are successively separated from the top thereof by the sheet separating mechanism and carried forwardly by the suction forwarder 202, 202 to a feed roller 211. The suction forwarding device, as before stated, grips each sheet centrally thereof near its forward edge and in accordance with the present invention means are provided for deflecting the side edges of the sheet upwardly to insure delivery of the sheets past a piling element 212 to the feed roller 211. Said means (Figs. 1, 2, 5 and 14) is preferably constructed and arranged as follows. Mounted on the arms 92, 92 adjacent the junction thereof with the forward side of the feeder frame 5, is a stay shaft 213 (Fig. 1) which extends transversely of the pile feeder at the front thereof. Fixed on the stay shaft 213 at intervals along the same, are brackets 214, 214 that carry the piling element 212. Said piling element is preferably comprised by a plate riveted or otherwise suitably secured to the brackets 214, 214, the front side of the pile of sheets 67 bearing against said plate and the upper edge thereof being interposed between the top of the pile of sheets and the feed roller 211. As herein shown, the sheet deflecting means is preferably formed on the upper end of the plate 212 which, for this purpose, is curved forwardly to provide a straight edge portion 215 (Fig. 5) in proximity to the feed roller 211, and sheet deflecting portions 216, 216 of downwardly and progressively increased, curved cross-section from a point on the straight edge portion 215 adjacent the suction sheet forwarder to the opposite ends of said straight edge portion. It will thus appear that if the side edges of the sheets have a tendency to drop below the suction sheet forwarder, said edges will be deflected upwardly by the sheet deflecting portions 216, 216 of the plate 212, thus preventing obstruction to the travel of the sheet and insuring that the sheet will pass over the upper end of the plate 212 to the feed roller 211.

*Air and suction control for the sheet separating mechanism and the sheet forwarding device, Figs. 1 to 5, inclusive, 7, 13 and 14 to 16, inclusive*

The feeder is provided with means for delivering air under pressure through the parts of the sheet separating mechanism comprised by the blow pipe 146 and the hollow foot clamp 146', and for creating suction at predetermined intervals in the suction sheet separator 147 and the suction sheet forwarder 202, 202. Said means may be of any desired type, but as herein shown the same is preferably comprised by the following instrumentalities. Bolted or otherwise suitably secured to a stationary base on the frame of the printing press, is an electric motor 217. Said motor is connected with any suitable source of electricity by a cable 218 and is controlled by a switch 219 mounted on one of the side frames 6, 6 of the printing press (Fig. 1). The motor 217 is connected, as by a belt or chain 220, with the shaft of a combined air and suction pump 221 that is driven through said belt or chain by the electric motor 217. The air delivery side of the pump 221 is connected, as by conduits 222 and 223, with a hollow ported valve housing 224 (Fig. 14) formed on a bracket 225 secured to one side of the feeder frame 5, as by machine screws 225'. The suction side of the pump 221 is connected with the valve housing 224 by conduits 226 and 227. Leading from the valve housing 224 is an air conduit 229 and a plurality of suction conduits 230 and 231. The air conduit 229 and the suction conduits 230 and 231, are connected with a ported distributor 232 carried by the pile feeder frame at the top thereof and controlled by an automatic multiple valve mechanism (not shown) preferably such as disclosed in application Serial No. 260,123, filed March 8, 1928 by E. R. Kast. Inasmuch as this automatic multiple valve mechanism forms no part of the present invention, it is unnecessary to describe the same in detail. It will be noted, however, that in the present machine, the automatic multiple valve mechanism may be driven from the shaft 45 which, for this purpose, has fixed thereon a bevel gear 233 (Fig. 6) that meshes with a similar gear 234 which is fixed on a shaft 235 journaled in suitable bearings in the distributor 232 and serving to drive the aforesaid multiple valve mechanism.

Leading from the distributor 232 is a conduit 236 that is connected with the blow pipe 146 and through which air is continuously delivered from said distributor through said blow pipe. Leading from said distributor is a conduit 236' which is connected with the foot clamp 146' and through which air is intermittently delivered by the action of one of the valves of the automatically operative valve mechanism within said distributor. The suction conduit 230 is connected within the distributor 232 with two conduits 237 and 238 that are controlled by a corresponding number of the valves of the automatically operated valve mechanism in said distributor. The suction conduit 237 is connected with the suction sheet separator 147 and the suction conduit 238 is connected with the pipe 205 of the suction sheet forwarding device 202, 202. The suction conduit 231 is connected through the distributor with a suction conduit 239 that is controlled by one of the valves of the automatically operated multiple valve mechanism within the distributor. The suction conduit 239 in turn is connected with a suction operated device that acts in conjunction with the printing press and forms no part of the present invention. The conduits 223 and 227 are preferably formed of flexible tubing or the like to provide for swinging movement of the pile feeder frame 5 toward and away from the printing press. The conduits connected with the distributor 232 are also preferably formed of flexible tubing to facilitate their connection with the various air and suction devices previously referred to.

During the normal operation of the machine, suction is automatically created and broken in the separator 147 and the forwarder 202, 202 so that successive sheets at the top of the pile 67 are separated and forwarded to the feed roller 211. At the same time, air is continuously blown through the blow pipe 146 and intermittently blown through the hollow foot clamp 146', these devices being arranged at the rear of the pile to deliver the air blasts between the uppermost sheets thereof and thereby separate said sheets as they are acted on by the separator 147. In accordance with the present invention, means are provided for regulating the pressure of air delivered through the blow pipe and foot clamp in accordance with the thickness of the sheets being handled in the machine, and said means is preferably constructed and operated as follows. Interposed between the pneumatic separator 146 and the air delivery side of the pump 221 is an air escape valve indicated broadly at 240 (Figs. 3, 4, and 14). As herein shown, said valve is arranged in the air delivery line between the opposed ends of the conduits 222 and 223 which, for this purpose, are connected by a hollow union 241 provided at the top thereof with an apertured threaded boss 242 in which is screwed the lower reduced end portion 243 of a vertically disposed valve casing 244. This valve casing 244 is provided in the side wall thereof with an elongated port 245 with which is adapted to register an elongated port 246 formed in the side wall of a tubular valve member 247 that is rotatably mounted in the valve casing 244.

The valve member 247 is open at its lower end to establish communication between said valve and the air delivery line. The upper end of the valve member 247 is closed by a knurled cap 248 that is secured to or formed integrally with the valve member 247 and serves to rotate the same to thereby bring the port 246 into partial or complete registration with the port 245. When the valve is turned to bring the ports 245 and 246 into partial or complete registration, a portion of the air delivered by the pump 221 through the air line passes through said ports directly to the atmosphere instead of being delivered to the blow pipe 146 and the hollow foot clamp 146'. In this manner, the pressure of the air delivered through the blow pipe 146 and the hollow foot clamp 146' may be regulated as desired in accordance with the thickness of sheets being handled in the machine, said air pressure being high or low when the valve is in its fully closed and open positions respectively, variable air pressures at the nozzles of the blow pipe 146 and the hollow foot clamp 146' being produced by turning the valve member 247 so that variable amounts of air pass directly to the atmosphere as above described. Suitable means may be provided for setting the valve to produce the desired air pressure at the nozzles of the blow pipe 146 and the hollow foot clamp 146' and, as herein shown, there is secured on the valve casing, as by machine screws 249, 249, a spring metal element 250 (Fig. 3) the upper end of which is turned over the cap 248 to provide a pointer 250ª that cooperates with a scale or indications 250ᵇ marked on the valve cap 248 and by which the valve may be set to the desired air pressure at the nozzles of the blow pipe 146 and the hollow foot clamp 146'. After the valve has been adjusted to provide the desired air pressure at the nozzles of the blow pipe 146 and the hollow foot clamp 146', said valve may be retained in its adjusted position by a set screw 250ᶜ threaded through a suitable opening in the valve casing 244 and adapted to be turned into and out of engagement with the valve member 247.

During the operation of the machine it is sometimes desirable to shut off the air and suction in the devices that act on the sheets as, for example, when making minor adjustments to said devices, removing from the machine a sheet that has become jammed during the feeding thereof, etc. In accordance with the present invention improved means are provided for this purpose, said means preferably being constructed and operated as follows. Arranged in the valve housing 224 (Fig. 14) is a slidable valve 251 (Figs. 15 and 16) through the lower end of which extends a port 252. This port 252 normally connects the air delivery conduit 223 with the air delivery conduit 229. The valve 251 is provided in its upper end with a port 255 that normally connects the suction conduit 227 with the suction conduit 230. It will of course be understood that communication between the several ports of the valve 251 and the aforesaid conduits is established when the valve is in its normal or operative position. The suction conduits 227 and 231 are preferably connected through the valve housing 224 at one side of the valve therein and therefore the suction in conduit 231 is not controlled by said valve. The suction in the conduit 231 could, however, be controlled by the valve 251, as by connecting said conduit with the conduit 230.

Secured on or formed integrally with the upper end of the valve 251 are a pair of spaced apertured ears 256, 256 between which extends the lower end of a link 257 that is pivotally connected with the valve 251, as by a pivot pin 258 which passes through a suitable opening in said lower end of the link 257 and through the apertures of the ears 256, 256. The upper end of the link 257 is pivotally connected, as at 259, with the free end of an arm 260 that is fixed on one extremity of a manually operable rockshaft 262. This rockshaft extends through and is journaled in the tubular stay shaft 186 (Fig. 13), the end of the rockshaft carrying the arm 260 projecting from one end of the stay shaft. The opposite end of said rockshaft projects from the opposite end of the stay shaft through an opening 261 (Figs. 1 and 7) in one of the brackets 92, 92 and carries an operating handle 263 fixed on said rockshaft between said bracket and one of the arms 91ª, 91ª.

In the operative position of the valve 251, it stands above the bottom of the valve housing 224 with the port 252 in communication with the air conduits 223 and 229 and the port 255 in communication with the suction conduits 227 and 230. If for any reason it is desired to shut off the air in the blow pipe 146 and the hollow foot clamp 146' and to shut off the suction in the separator 147 and the forwarder 202, 202, the rockshaft 262 is rotated by the handle 263 in a counterclockwise direction as viewed in Fig. 14, thereby lowering the arm 261 and the link 257 so as to lower or slide the valve 251 downwardly in the valve housing 224. When the valve 251 is thus lowered, the port 252 no longer communicates with the air delivery conduits 223 and 229 and the port 255 no longer communicates with the suction conduits 227 and 230, respectively. The valve therefore acts to cut off the supply of air to the blow pipe 146 and the hollow foot clamp 146' and to cut off the suction in the separator 147 and the forwarder 202, 202. It will obviously appear that when the rockshaft 262 is turned by the handle 263 in a clockwise direction, the valve 251 will be raised so that the port 252 communicates with the air delivery conduits 223 and 229 and the port 255 communicates with the suction conduits 227 and 230, respectively. Air will thus be delivered through the blow pipe 146 and the hollow foot clamp 146', while at the same time, suction will be intermittently created and broken in the separator 147 and the forwarder 202, 202 as before described.

In order to limit the movement of the valve 251 between its operative and inoperative positions, the handle 263 is provided with an arm 264 having a pin 265 thereon that projects through an arcuate-shaped opening 266 formed in one of the arms 91ª, 91ª of the feeder frame 5. When the rockshaft 262 is operated by the handle 263 to slide the valve between its operative and inoperative positions, the pin 265 engages the opposite ends of the slot 266 and thus limits the sliding movement of said valve. The handle 263 is further provided with a second arm 267 to the free end of which is pivotally connected one extremity of a rod 268. The opposite extremity of the rod 268 passes loosely through an eye 269 of a screw 270 that is secured in a suitable threaded opening in one side of the feeder frame 5. Arranged on the rod 268 between the eye 269 and a collar 271 fixed on said rod, is a spring 272 which, together with the rod 268 and the arm 267 provides a toggle that acts to hold the valve 251 in its operative and inoperative positions and thereby prevent accidental movement of said valve from said positions.

*Main and auxiliary feed rollers, Figs. 1, 2, and 17 to 20, inclusive*

In accordance with the present invention improved feed devices are provided for advancing the sheets from the sheet forwarder to the printing press or device to be fed, and said devices are preferably operated and constructed as follows. Fixed on the shaft 39 is a spur gear 273 (Fig. 17) that meshes with a spur gear 274 which is rigidly secured on a shaft 275. This shaft 275 has fixed thereon the feed roller 211 and said shaft extends transversely of the feeder and is journaled in suitable bearings in the arms 91ª, 91ª of the feeder frame 5. As the sheet is fed over the sheet deflector 216, 216 by the forwarder 202, 202, said sheet passes between the feed roller 211 and auxiliary yieldable feed rollers 276, 276 (Fig. 13). These auxiliary feed rollers tend to engage the sheet with the main feed roller 211 so that the latter positively feeds the sheet forwardly to other rollers hereinafter described. During the normal operation of the machine, the auxiliary rollers 276, 276 are not positively raised and lowered but on the contrary, said rollers are continuously urged toward the feed roller 211 to hold the sheets in engagement therewith.

The feed rollers 276, 276 are journaled on the free ends of arms 277, 277 which are loosely mounted on the tube 277x. This tube is rigidly secured on the arms 91a, 91a, and the rockshaft 91 extends through and projects from the outer ends of said tube which are provided with bushings that form bearings for said rockshaft. The arms 277, 277 have spaced apertured ears 278, 278 through which the rigidly mounted tube 277x loosely extends. Fixed on the rigidly mounted tube 277x between the apertured ears 278, 278, are arms 279, 279 the free ends of which are bent upwardly and rearwardly and terminate in apertured bosses 280, 280. Extending vertically through the apertures of said bosses are guide pins 281, 281 that are secured on the rear, free ends of the arms 277, 277. Threaded on the guide pins 281, 281 are adjusting nuts 282, 282 and lock nuts 283, 283, and arranged on the guide pins 281, 281 between the adjusting nuts 282, 282 and the apertured bosses 280, 280, are springs 284, 284. These springs 284, 284 provide for yielding movement of the auxiliary feed rollers 276, 276 and at the same time serve together with the adjusting nuts 282, 282 and the lock nuts 283, 283, to produce any desired pressure of said auxiliary feed rollers on the sheet and the main feed roller 211.

The main and auxiliary feed rollers 211 and 276, 276 feed the sheet forwardly to sheet feeding means which advances the sheet to the printing press or other device to be fed and is preferably operated and constructed as follows. Extending transversely of the feeder frame 5, and journaled in suitable bearings on the arms 91a, 91a thereof, is a shaft 285 (Fig. 17) having fixed thereon a spur gear 286 and a bevel gear 287. The spur gear 286 meshes with the spur gear 273 which thus serves to drive the shaft 285 and the bevel gear 287. The bevel gear 287 meshes with a similar gear 288 that is fixed on a shaft 289 extending at right angles to the shaft 285 and journaled in suitable bearings on one of the arms 91a, 91a of the feeder frame (Fig. 2). Fixed on the shaft 289 at intervals along the same are a plurality of bevel gears 290, 290 that mesh with bevel gears 291, 291 which are fixed on a plurality of shafts 292, 292 extending in parallel relation transversely of the feeder frame and journaled in suitable bearings on the arms 91a, 91a thereof.

The shafts 292, 292 as well as the shaft 285 are all arranged in the same plane and have fixed thereon two spaced parallel series of sheet feeding rollers 293, 293 and 294, 294 which have equal diameters and are positively driven by the bevel gears 290, 290 and 291, 291 so as to feed the sheets from the feed roller 211 to the impression cylinder 18 of the printing press. Extending transversely of the arms 91a, 91a and secured to the forward ends thereof, is a cross member or plate 295 which has secured thereto intermediate its opposite ends, one extremity of an arm or center bearing 296 (Figs. 1 and 18). This arm 296 extends in parallel relation with the arms 91a, 91a and its opposite extremity is secured to the forward side of the feeder frame 5. The arm 296 is provided at intervals along the same with bearings 297, 297 for the shafts 292, 292 and it will thus appear that the arm 296 provides additional support for the shafts 292, 292 and the parallel series of rollers 293, 293 and 294, 294 that are spaced from each other by said arm. The foremost of the shafts 292, 292 has fixed thereon a plurality of relatively short feed rollers 298, 298 between which extend lugs 299, 299 that project rearwardly from the cross member 295 and prevent obstruction of the sheet by the rear edge of said cross member.

Arranged between the feed roller 211 and the first set of rollers 293, 294 in advance thereof, is a bridge plate 299a (Figs. 1, 13 and 18) which bridges the gap between said rollers and prevents the sheets from being deflected downwardly therebetween. This bridge plate extends transversely of the feeder frame 5 and is rigidly secured in any suitable manner to the opposite sides thereof. Extending forwardly over the rollers 293, 294 are strips 299b of brass or other suitable material that prevent curled down sheets from being deflected downwardly between said rollers. The strips 299b are preferably held in position on the rollers 293, 294 by clips 299c secured to or formed integrally with the rear ends of said strips and detachably engaged with the rear edge of the bridge plate 299a. Secured to the arms 91a, 91a and extending between the same under the rollers carried thereby, is an apron 299d (Fig. 17) made of canvas or other suitable material. This apron serves to catch dust, lint, and loose particles of the material fed, thus preventing said dust, lint, and particles from falling onto the bed of the press. Secured to each forward corner of the apron 299d and to the forward end of the adjacent arm 91a, is a spring 299e which, together with similar springs secured to the rear corners of the apron and to the arms 91a, 91a, serves to stretch said apron and maintain the same in proper position under the rollers carried by said arms.

Extending transversely of the feeder and above the parallel series of feed rollers 293, 293 and 294, 294, is a shaft 300 that is supported by arms 301, 301 (Fig. 1) that project rearwardly from bearing brackets 302, 302 bolted or otherwise suitably secured on the upper sides of the arms 91a, 91a between the opposite ends thereof. Supported on the shaft 300 are a pair of ball holders 303, 303 extending in parallel relation with each other and with the arms 91a, 91a and each disposed over one of the parallel series of feed rollers 293, 293 and 294, 294. The ball holders 303, 303 are each secured to the rod or shaft 300 by a plate 304 and machine screws 305, 305. Said screws extend through openings in the opposite ends of said plate and are threaded in suitable openings in a lug 306 that projects upwardly from the ball holder. Each ball holder 303 is provided at intervals therealong with vertical openings 307, 307 which extend entirely through the ball holder and are each disposed over one of the feed rollers of the parallel series 293, 293, 294, 294. Mounted freely in the openings 307, 307 of each ball holder are balls 308, 308 which, during the operation of the machine, engage the sheet with the feed rollers so as to prevent slippage of the sheet on the rollers and insure feeding of the sheet thereby to the printing press or other device to be fed. The balls 308 are retained against displacement from the ball holder 303, by retainer clips 308x secured on the ball holders 303, as by set screws 308y. Each of said retainer clips is preferably positioned between a pair of the openings 307 so that the ends of the clip project thereover and prevent the balls in said openings from being displaced vertically therefrom. Disposed between each of the arms 91a, 91a and one of the ball holders 303, 303 and extending in parallel relation therewith, are a pair of spaced top rods 309, 309 (Fig. 1) that act to hold the sheet against upward displacement from the feed rollers as the sheet is advanced thereby toward the printing press. These top rods 309, 309 are preferably supported above the feed rollers by brackets 310, 310 mounted on the tube 277ˣ.

The sheets are intermittently pressed into engagement with the foremost of the rollers 293, 294, by balls 313 carried on arms 311, 311 which are fixed in spaced relation on a rockshaft 312 that is journaled in the bearing brackets 302, 302 and operated in a manner to be presently described. Each of the arms 311, 311 has extending through the free end thereof an opening 312 in which is freely mounted one of the balls 313 which intermittently engages the sheet to hold it down on the adjacent roller. Each ball is retained against displacement upwardly through the opening 312, by a screw 314 threaded in a suitable opening in the free end of the arm 311 and having its head projecting inwardly over the opening 312.

During feeding of the sheets to the printing press, said sheet may be slowed down, momentarily stopped, and front registered by any suitable devices for this purpose (not shown). The sheet may also be side registered by mechanism which, as herein shown, preferably comprises a plate 315 (Fig. 17) that is slidable along and movable toward and away from a groove 316 extending longitudinally of the cross member 295 and in parallel relation with a scale 317 (Fig. 18) carried thereby. The side registering member 315 is fixed on a rod or shaft 318 that is carried on the forward ends of arms 319, 319 which are rigidly secured to the rockshaft 312. During the operation of the machine, the shaft 312 is rocked and moved endwise in its bearings 302, 302 to move the arms 311, 311 and 319, 319 in opposite directions vertically and laterally so that the sheets are successively engaged by the balls 313 and successively side registered by the plate 315.

In order to prevent curled up sheets from being obstructed by the rod 318, light strips 319ᵃ, preferably made of clock spring material or the like, engage said sheets on the upper sides thereof and turn the curled up edges of the sheets down so that they pass freely under the rod 318 to the press (Figs. 1 and 18). The forward ends of the strips 319ᵃ are received in the groove 316 of plate 295, and said strips are rigidly secured, as at 319ᵇ, on clamps 319ᶜ, which in turn are rigidly secured by set screws 319ᵈ, on the rod 300.

The rocking movement of the shaft 312 is obtained through the medium of the following instrumentalities. Fixed on the cam shaft 45 is a cam 320 that engages a roller 321 carried on the laterally and upwardly bent extremity of an arm 322 that is loosely mounted on a stud 322ˣ which is mounted in one of the arms 91ᵃ, 91ᵃ. Connected with the arm 322 is one end of a spring 323 the opposite end of which is anchored to the machine frame work in any suitable manner. The spring 323 acts to always maintain the roller 321 in engagement with the cam 320 so that during rotation of said cam the arm 322 is rocked on the stud 322ˣ. Pivotally connected with the arm 322 is one extremity of a rod 324 the opposite extremity of which is pivotally connected with one arm 325 of a bell crank 326. The bell crank 326 is loosely mounted on the shaft 312 at one end thereof and the other arm 327 of said bell crank is provided longitudinally thereof with a slot 328 through which extends a pin or projection 329 that is secured on one of the arms 319, 319. When the low part of the cam 320 engages the roller 321, the rod 324 is pulled rearwardly through the energy of spring 323, thus turning the bell crank 326 in a counterclockwise direction as viewed in Fig. 17, so that the pin 329 engages the rear end of the slot 328 and rocks the shaft 312 upwardly to lift the arms 311, 311 and the arms 319, 319 and thereby lift the balls 313 and the side registering device 316. When the roller 321 is engaged by the high part of the cam 320, the rod 324 is pushed forwardly whereupon the arms 311, 311 and the arms 319, 319 drop to lower the balls 313 and the side registering device 315 into engagement with the sheet and the groove 316 respectively (Fig. 1).

The endwise sliding movement of the shaft 312 is obtained through the medium of the following instrumentalities. Fixed on the cam shaft 45 is a cam 330 that engages a roller 331 carried on the upper end of an arm 332 that is provided with a pin 332ᵃ on which is secured one end of a spring 332ᵇ. The opposite end of the spring 332ᵇ is secured to a stationary part of the machine and said spring acts to continuously maintain the roller 331 in engagement with the cam 330. The arm 332 is mounted for rocking movement on a stationary part of the machine framework, and seated in the forked upper end of said arm is a ball 333 through which loosely extends a rod 334. The rear end of the rod 334 has threaded thereon a nut 335, and mounted on the rod 334 forwardly of the ball 333, is a spring 336 that is retained on the rod between the ball and a collar 337 secured on said rod. When the high part of the cam 330 engages the roller 331, the rod 334, is moved forwardly and when the low part of the cam 330 engages the roller 331, the rod 334 is moved rearwardly.

The forward end of the rod 334 is pivotally connected at 337ᵃ or 337ᵇ with one or the other of a pair of arms 338, 338 of a double bell crank lever 339 that is journaled on a vertical stud 340 which projects upwardly from one of the bearings 302, 302. Another arm of the double bell crank 339 is comprised by a fork 341 the ends of which are engaged in the groove of a collar 342 that is fixed on the rockshaft 312. From the foregoing it will appear that as the rod 334 is reciprocated, the bell crank 339 is rocked so that the latter acts through the fork 341 and the collar 342 to slide the rockshaft 312 in its bearings 302, 302. The side registering device 315 is thus reciprocated laterally to side register the sheets in a well known manner, and the balls 313 roll along the sheet while it is being side registered. During the sliding movement of the shaft 312, the pin 329 slides in the slot 328 of the bell crank 326, the latter being retained against endwise movement on said shaft by any suitable means for this purpose.

*Operation*

The operation of the machine will be readily understood from the foregoing and may be briefly summarized as follows. The pile feeder frame 5 is swung away from the press to provide for positioning of the forms on the press, whereupon said frame is swung back toward the press and locked to the frame 6, 6 thereof by the locking means 10, 14, 16ᵇ, 16ᵍ. The frame 93, 93 and the sheet separating mechanism carried thereby are swung upwardly and locked in their raised inoperative position by the supports 155, 155. The pile of sheets 67 having been previously placed on the piling board 66, as before described, is run into the feeder so as to be supported in operative position thereon by the cross bars 79, 79 and a pair of the conveyor flights 65, 65. The frame 93, 93 and the sheet separating mechanism are then swung downwardly onto the frame 5. The sheet separating means is then adjusted along the bar 108 and the frame members 93, 93 in accordance with the horizontal dimensions of the pile of sheets to be fed in the machine, the pile stops 153 and 153' being moved with the sheet separating mechanism and engaging the rear and one side of the pile respectively to automatically position said mechanism properly with respect to said pile. The press is then started and through the driving connection between the same and the feeder, the pile of sheets is fed upwardly and the sheets are successively separated from the top of the pile by the sheet separating mechanism. As each sheet is separated, it is forwarded from the pile feeder by the sheet forwarding device 202, 202 which advances said sheet between the feed roller 211 and the feed rollers 276, 276. These rollers in turn advance the sheet between the balls 308, 308 and the parallel series of driven feed rollers 293, 293 and 294, 294. These parallel series of rollers feed the sheet forwardly to a point where it is engaged by the balls 313, 313, whereupon the sheet may be slowed down, temporarily stopped, and front registered by suitable devices (not shown). The side registering device 315 then acts to side register the sheet which is then fed by the feed rollers 298, 298 to the grippers of the impression cylinder 18. After the sheet is gripped on the cylinder 18 and carried around the same to be printed, said sheet is delivered from the machine by any suitable means for this purpose.

What is claimed is:

1. In a pile feeder, spaced side frames, an elevator supported on and between the side frames, tracks extending between the side frames at the bottom of the elevator, a pile board movable into the feeder between the side frames and along the tracks, and cross members secured to the pile board and having grooves adapted to engage said tracks and notched ends adapted to engage flights of said elevator.

2. In a pile feeder, endless driven means at opposite sides thereof, a pile board movable into and out of the feeder through the rear thereof and between said endless driven means, flights on the endless driven means and movable upwardly thereby to engage and elevate the pile board when it is moved into the feeder, and means on the rear portions of said flights adapted to aline with and prevent accidental displacement of the pile board rearwardly on the flights when the latter are moved upwardly into engagement with said board.

3. In a pile feeder, endless driven conveyors at opposite sides thereof, a pile board movable into and out of the feeder through the rear thereof and between the endless driven conveyors, flights on said conveyors and movable upwardly thereby to engage and elevate the pile board when it is moved into the feeder, cross members on the pile board and having notched ends adapted to engage the flights, and stops projecting from the flights at the rear thereof and adapted to aline with and prevent accidental displacement of the pile board rearwardly on said flights when the latter are moved upwardly into engagement with said board.

4. In a pile feeder, a frame open at the rear thereof, spaced tracks at the bottom of the frame, a pile board movable into the feeder along the tracks through the open rear portion of said frame, cross members on the pile board having grooves to engage said tracks and notched ends adjacent opposite sides of said pile board, vertically extending endless driven conveyors mounted on the frame at the outer sides of the spaced tracks respectively, and flights on said conveyors adapted to engage the notched ends of said cross members and lift the pile board off said tracks when the conveyors are moved upwardly.

5. In combination, a pile support having a slot therein, a channelled member having a reduced portion opening upwardly through the slot and an enlarged portion secured to the under side of the pile support below said slot, a piling bar, and means on said piling bar extending loosely through the reduced portion of the channelled member and slidably engaged in the enlarged portion of said channelled member whereby the piling bar may be moved along the channelled member and the slot to various positions on said pile support.

6. In combination, a pile support having a slot reduced at the top and enlarged at the bottom thereof, a piling bar having a horizontal arm resting on the pile support above the reduced top portion of said slot, a bolt having its head slidably engaged in the enlarged bottom portion of the slot and a threaded shank passing upwardly through the reduced top portion of the slot and a suitable opening in said horizontal arm, and a clamping element threaded on said shank above said arm.

7. The combination with a sheet feeder having a pile elevator adapted to be loaded through the rear thereof between its pile supporting and moving elements, of a frame pivotally mounted adjacent the top and front of the elevator on an axis extending transversely of the direction of feed of the sheets therefrom, and sheet separating means carried by said frame and movable upwardly therewith to an inoperative position above the elevator for loading of the latter as aforesaid, the sheet separating means thereafter being movable downwardly with the frame to an operative position at the top of said pile.

8. The combination with a sheet feeder having a pile elevator adapted to be loaded through the rear thereof between its pile supporting and moving elements, of sheet separating means pivoted to the feeder frame on an axis extending transversely of the direction of feed of the sheets from said elevator, whereby said sheet separating means may be swung upwardly and forwardly to an inoperative position for loading of the elevator as aforesaid.

9. The combination with a sheet feeder having a pile elevator adapted to be loaded through the rear thereof between its pile supporting and moving elements, of a frame arranged to swing on an axis extending transversely of the direction of feed of the sheets from said elevator, sheet separating means carried by said frame and movable upwardly and downwardly thereby to operative and inoperative positions, and means for releasably locking the frame when it is raised, whereby the sheet separating means is held in its raised inoperative position for loading of the elevator as aforesaid.

10. The combination with a sheet feeder having a pile elevator adapted to be loaded through the rear thereof between its pile supporting and moving elements, of a frame arranged to swing above the elevator about an axis extending transversely of the direction of feed of the sheets therefrom, sheet separating means carried by said frame for upward swinging movement therewith to an inoperative position and downward swinging movement to an operative position, and latch means for releasably locking said frame when it is raised, whereby the sheet separating means is held upwardly in its inoperative position for loading of the elevator as aforesaid.

11. The combination with a sheet feeder having a pile elevator adapted to be loaded through the rear thereof between its pile supporting and moving elements, of a frame pivotally mounted adjacent the top and front of the elevator to swing in opposite directions about an axis extending transversely of the direction of feed of the sheets from said elevator, and sheet separating means mounted on and movable laterally and longitudinally of the frame to various positions of adjustment, said sheet separating means being movable upwardly and forwardly by the frame to an inoperative position for loading of the elevator as aforesaid and thereafter being movable downwardly and rearwardly by said frame to an operative position adjacent the top of said elevator.

12. The combination with a pile feeder and sheet engaging means, of a frame arranged to swing toward and away from said feeder and carrying said sheet engaging means, a pin projecting from the frame, a pivoted element provided longitudinally thereof with a pin receiving guide having a notch intermediate its ends engaged by the pin when the frame is swung to one position, and means in said guide past which the pin travels when the frame is swung in one direction from the first position to a second position, said means preventing reengagement of the pin in the notch when the frame is swung in the opposite direction from the second position to a third position.

13. The combination with a pile feeder and sheet engaging means, of a frame arranged to swing toward and away from said feeder and carrying said sheet engaging means, a pin projecting from the frame, a pivoted element provided longitudinally thereof with a pin receiving guide having a notch intermediate its ends and engaged by the pin when the frame is swung to one position, a spring pressed pawl mounted on said pivoted element and past which the pin moves when the frame is swung in one direction from the first position to a second position, and a lug in said guide normally engaged by said pawl and adapted therewith to prevent reengagement of the pin in the notch when the frame is swung in the opposite direction from the second position to a third position.

14. The combination with a pile feeder and sheet engaging means of a frame arranged to swing up and down relative to said pile feeder and carrying said sheet engaging means, a pin projecting from one side of the frame, a pivoted support provided with a pin receiving guide having a notch intermediate the ends thereof, a lug in said guide engageable by the pin to move said pivoted support and engage said notch with said pin when the frame is moved upwardly to one position, and a spring pressed pawl normally engaged with the lug and providing for movement of the pin past the same when the frame is swung upwardly from the first position to a second position said pawl and the lug preventing engagement of the pin with the notch when the frame is swung downwardly from said second position to a third position.

15. In combination, a pivotally mounted device provided with a pin or projection, a pivoted element provided with a pin receiving guide having a notch intermediate the ends thereof in which said pin is engaged when said device is swung to one position, and means on said pivoted element providing for swinging movement of the pin and device in one direction to a second position and adapted to prevent engagement of the pin in said notch when the device is swung in the opposite direction to a third position.

16. In combination, a pivotally mounted device provided with a pin or projection, a pivoted element provided with a pin receiving guide having a notch in which said pin is engaged when said device is swung to one position, a yieldable pawl past which the pin moves when the pivotally mounted device is swung in one direction to a second position and a cam in said guide normally engaged by said pawl and acting therewith to prevent reengagement of the pin in the notch when the pivotally mounted device is swung in the opposite direction from said second position to a third position.

17. In combination, a pivotally mounted device having a pin or projection, a pivoted element provided with a guide receiving said pin and having a notch intermediate its opposite ends, a lug disposed in the guide in spaced relation with the latter and said notch, and a spring pressed pawl mounted on the pivoted element adjacent the notch and normally engaged with said lug.

18. In combination, a pivotally mounted device having a pin or projection, a pivoted element provided with a guide receiving said pin and having a curved wall portion, spaced straight wall portions joining said curved wall portions, and a notch between adjacent ends of said straight wall portions, a lug disposed in the guide in spaced relation with its wall portions and said notch, and a spring pressed pawl mounted on the pivoted element adjacent one of said straight wall portions and normally engaged with said lug.

19. In combination with a normally stationary part and a member movable toward and away from the same, a pin or projection on said member, a pivotally mounted element provided with a guide receiving said pin or projection and having a notch intermediate its opposite ends, a lug on said element extending in said guide in spaced relation with its wall and said notch, and a spring-pressed pawl pivoted on said element adjacent the notch and normally engaged with said lug.

20. The combination with a device to be fed and a pile feeder arranged to swing toward and away from the same, of a pivotally mounted frame arranged to swing with said pile feeder and toward and away from the same, sheet separating means carried by said frame, a power shaft on the pivotal axis of the pile feeder, a shaft on said frame and operatively connected with the sheet separating means, and a universal, telescopic driving connection between said shafts.

21. The combination with a device to be fed and a pile feeder arranged to swing toward and away from the same, of a pivotally mounted frame arranged to swing with the pile feeder and toward and away from the same, sheet separating means carried by said frame, a power shaft on the pivotal axis of the pile feeder, a shaft on said frame and operatively connected with said sheet separating means, and a universal joint having opposed parts thereof slidably keyed to opposed ends of said shafts respectively.

22. In combination, supporting means, a frame pivoted thereon and carrying sheet separating means, a power shaft, a driven shaft mounted on said frame and normally alined with said power shaft, driving connections between said driven shaft and the sheet separating means, and a universal connection having opposed parts thereof slidable keyed to opposed ends of said shafts respectively.

23. In combination, supporting means, a frame pivoted thereon and carrying sheet separating means, a power shaft, a driven shaft carried on said frame and normally alined with the power shaft, driving connections between the driven shaft and said sheet separating means, and a universal connection arranged opposite the pivotal axis of the frame and having opposed sleeve-like parts slidably keyed on opposed ends of said shafts respectively.

24. The combination with means to be fed, of a vertical driving shaft connected therewith, a vertical driven shaft continuously maintained in alignment with the vertical driving shaft, a sheet engaging device continuously connected with said vertical driven shaft and operated thereby, and a driving connection between said shafts slidable over opposed ends thereof and movable therealong to disconnect the same whereby said sheet engaging device may be properly set or adjusted.

25. The combination with means to be fed and a pile feeder arranged to swing toward and away from the same, of a driving shaft arranged on the pivotal axis of the pile feeder and connected with said means, a driven shaft arranged on said axis, a driven sheet engaging device carried on the pile feeder frame and continuously connected with said driven shaft, and an adjustable driving connection between said shafts movable to disconnect the same whereby said sheet engaging device may be properly set or adjusted.

26. In combination, a driving shaft, a driven shaft continuously maintained in alignment therewith, sheet engaging means continuously connected with said driven shaft and operated thereby, a sleeve-like element keyed to and slidable along one of said shafts onto and off of the other of said shafts, and means for detachably connecting said element with the last named shaft.

27. In combination, a driving shaft, a driven shaft continuously alined therewith, sheet engaging means continuously connected with said driven shaft and operated thereby, a member engaged over opposed ends of said shafts and keyed to and slidable along one shaft into and out of operative relation with the other shaft, and an element for detachably connecting the last named shaft with said member when it is moved into operative relation therewith.

28. The combination with sheet separating means, a feed roller, and means for forwarding the sheet from the sheet separating means to the feed roller, of a fixed tubular element mounted adjacent the feed roller, a rockshaft journalled in the tubular element, a swinging frame carrying the sheet separating means and fixed on said shaft, and an auxiliary feed roller mounted on said fixed tubular element in cooperative relation with said first named feed roller.

29. The combination with sheet separating means, a feed roller, and means for forwarding the sheet from the sheet separating means to the feed roller, of a stationary tube adjacent the feed roller, a rockshaft journalled in said tube and projecting from the opposite ends thereof, a swinging frame carrying the sheet separating means and fixed on the projecting ends of said rockshaft, and a yieldably mounted roller carried by the stationary tube for holding the sheet in engagement with the feed roller.

30. The combination with sheet separating means, a feed roller, and means for forwarding the sheet from the sheet separating means to the feed roller, of a fixed tube mounted adjacent the feed roller, a rockshaft journalled in the tube, a swinging frame carrying the sheet separating means and fixed on said rockshaft, a pair of arms one fixed on the tube and the other loosely mounted thereon, a yieldable and adjustable connection between said arms, and a roller on the loosely mounted arm adapted to engage the sheet with the feed roller.

31. The combination with pneumatic sheet separating means, suction sheet separating means, and means for delivering air through said pneumatic sheet separating means and for creating suction in said suction separating means, of a slidable valve controlling the air and suction in said means, a manually operable rockshaft, and means connecting the rockshaft with the slidable valve for operating the latter by the former.

32. The combination with pneumatic sheet separating means, suction sheet separating means, and means for delivering air through said pneumatic sheet separating means and for creating suction in said suction separating means, of a pivoted frame carrying the sheet separating means and having a slot in one side thereof, a manually operable rockshaft having one end projecting through said slot and provided adjacent the same with an operating handle, a valve controlling the air and suction in said sheet separating means, and means connecting the valve with the rockshaft for operating the former by the latter and said handle.

33. The combination with a suction sheet forwarding device, an oscillating tube for reciprocating the same, and means for creating suction in said device, of a valve controlling the suction in the sheet forwarding device, a manually operable rockshaft extending through said tube and on which the latter is oscillated, and means connecting said valve with said rockshaft for operating the former by the latter.

34. The combination with suction sheet engaging means and means for creating suction therein, of a pivotally mounted frame carrying the sheet engaging means and operable to move the same to operative and inoperative positions, a valve controlling the suction in the sheet engaging means, a manually operable rockshaft, and means connecting said rockshaft with said valve for operating the latter by the former.

35. The combination with a printing press and a pile feeder arranged to swing toward and away from the same, of sheet feeding means carried by the pile feeder and comprising a plurality of rollers arranged in spaced relation in a single plane and adapted to feed the sheets forwardly from the pile feeder to said printing press, a power shaft arranged on the pivotal axis of the pile feeder and driven from said printing press, and means connecting said shaft with said rollers for driving the latter from the former and continuously connecting the rollers with the printing press regardless of the position of the pile feeder with respect thereto.

36. In a sheet feeding apparatus, a frame therefore, a main feed roller mounted on the frame, arms projecting from the frame forwardly of the main feed roller, a series of sheet advancing rollers arranged in an inclined plane and journalled on said arms, and a bridge plate secured to said frame and extending between said main feed roller and the adjacent roller of said series.

37. In a sheet feeding apparatus, a main feed roller, a series of sheet advancing rollers arranged forwardly thereof, a bridge plate extending between said main feed rollers and the adjacent roller of said series, and one or more stationary elements secured to said bridge plate and extending longitudinally of the apparatus over said series of sheet advancing rollers so as to prevent the sheets from being deflected downwardly therebetween.

38. In apparatus of the character described, means for feeding a pile of sheets, and corner lifting means, sheet separating means, and pile guiding means all mounted together as a unit slidable laterally on the feeder to various positions of adjustment thereon, said pile guiding means being adjustable laterally on the unit relative to the remaining elements thereof to engage a side of the pile when the corner lifting means of said unit is moved out of engagement with said pile.

39. In apparatus of the character described, a pile feeder, and sheet separating means, corner lifting means, and a pile guide all mounted together as a unit movable to various positions of adjustment on the feeder, the corner lifting means being rendered operative and inoperative when the unit is moved to certain of said positions, and the pile guide being adjustable on the unit relative to the remaining elements thereof to engage the pile when the corner lifting means of said unit is rendered inoperative.

40. In apparatus of the character described, a pile feeder, and a sheet separator, a corner lifter, and a pile guide mounted together as a unit movable to various positions of adjustment on the feeder, the corner lifter being rendered operative and inoperative when the unit is moved to certain of said positions, and means providing for adjustment of the pile guide in opposite directions relative to the remaining elements of the unit to engage the pile when the lifter is rendered operative and inoperative as aforesaid.

41. In apparatus of the character described, a pile feeder, and a sheet separating device, a corner lifting device, a pile guiding device, and a carriage all mounted together as a unit movable on the feeder to various positions of adjustment thereon, the corner lifting device being rendered operative and inoperative when the unit is shifted to certain of said positions, and means connecting the pile guiding device with said carriage and providing for shifting of said pile guiding device in opposite directions on the carriage to engage the pile when said corner lifting device is rendered operative and inoperative as aforesaid.

42. In apparatus of the character described, means for elevating a pile of sheets, supporting means therefor, a frame mounted on the supporting means to swing up and down relative to said elevating means, a carriage slidably mounted on the frame, and a sheet separating device, a corner lifting device, and a pile guiding device all mounted on said carriage and movable therewith as a unit to various positions of adjustment on said frame.

43. In apparatus of the character described, means for elevating a pile of sheets, supporting means therefor, side members and a cross member constituting therewith a frame mounted on said supporting means to swing up and down relative to said elevating means, a carriage slidably mounted on the cross member, and a sheet separating device, a corner lifting device, and a pile guiding device al mounted on said carriage and movable therewith as a unit to various positions of adjustment on said cross member.

44. In apparatus of the character described, corner lifting means, sheet separating means, and a pair of stop devices all movable as a unit with respect to a pile of sheets, the stop devices being adapted to engage the rear and one side of the pile to thereby automatically position said sheet separating means with respect to said pile, and one of said stop devices being shiftable in opposite directions to engage the pile when the corner lifting means is moved into and out of operative position relative thereto.

45. In apparatus of the character described, means for elevating a pile of sheets, supporting means therefor, side members and a cross member constituting therewith a frame mounted on said supporting means to swing up and down relative to said elevating means, a carriage slidably mounted on the cross member, a separating device, a corner lifting device, and a pile guiding device all mounted on said carriage and movable therewith as a unit to various positions of adjustment on said cross member, and one or more additional pile guiding devices mounted on the cross member and adjustable thereon independently of the carriage and the devices carried thereby.

46. In apparatus of the character described, means for elevating a pile of sheets, supporting means therefor, side members and a cross member constituting therewith a frame pivoted on said supporting means to swing up and down relative to said elevating means, one or more pile guiding devices mounted on the cross member for movement to inoperative and operative positions when the frame is swung up and down respectively, and means providing for adjustment of said pile guiding device or devices along said cross member.

47. In apparatus of the character described, means for elevating a pile of sheets, supporting means therefor, side members and a cross member adjustable therealong and constituting therewith a frame pivoted on said supporting means to swing up and down relative to said elevating means, and pile guiding means mounted on and adjustable with said cross member along the side members and movable up and down with said frame to inoperative and operative positions respectively.

48. In apparatus of the character described, an elevator adapted to receive a pile of sheets and feed the same upwardly, a pivotally mounted frame extending over the elevator to swing up and down above the same, and pile guiding means and sheet separating means mounted on said frame to swing upwardly therewith while the pile of sheets is being loaded on said elevator, said pile guiding and sheet separating means thereafter being movable downwardly with the frame toward the pile to engage side and top portions thereof so that the pile guiding and sheet separating means may guide the pile and separate the sheets therefrom respectively.

49. In apparatus of the character described, an elevator adapted to receive a pile of sheets and feed the same upwardly, a pivotally mounted frame extending over the elevator to swing up and down above the same, sheet separating means mounted on said frame and movable upwardly therewith above the elevator while the pile of sheets is being loaded thereon, said sheet separating means thereafter being movable downwardly with the frame toward the elevator to engage the top of the pile and separate the sheets successively therefrom, and pile guiding means mounted on the frame and movable upwardly with the latter and the sheet separating means and downwardly therewith to engage a side or sides of the pile and guide it during operation of the sheet separating means and the elevator.

50. In apparatus of the character described, means for elevating a pile of sheets, supporting means therefor, side members and a cross member adjustable therealong and constituting therewith a frame pivoted on said supporting means to swing up and down relative to said elevating means, pile guiding means mounted on and adjustable with said cross member along the side members and movable up and down with said frame to inoperative and operative positions respectively, and means for moving the cross member and said pile guiding means as a unit in opposite directions along said side members.

51. In apparatus of the character described, an elevator adapted to support a pile of sheets and feed the same upwardly, means supporting the elevator, a frame pivoted on said means and extending over the elevator to swing up and down above the same, and sheet separating means mounted on and adjustable along said frame and movable up and down thereby to inoperative and operative positions respectively.

52. In apparatus of the character described, an elevator adapted to support a pile of sheets and feed the same upwardly, means supporting the elevator, a frame pivoted on said means and extending over the elevator to swing up and down above the same, and sheet separating means mounted on and adjustable laterally and longitudinally along said frame and movable up and down thereby to inoperative and operative positions respectively.

53. In apparatus of the character described, means for elevating a pile of sheets, supporting means therefor, side members and a cross member constituting therewith a frame pivoted on said supporting means to swing up and down relative to said elevating means, pile guiding means for the rear and one or more sides of the pile and mounted on said cross member to swing up and down with said frame to inoperative and operative positions respectively, and means providing for adjustment of the pile guiding means to various positions along the cross member.

54. In apparatus of the character described, an elevator adapted to receive a pile of sheets and feed the same upwardly, means supporting the elevator, a frame pivoted on said means and extending over the elevator to swing up and down above the same, and sheet separating means and pile guiding means mounted on and adjustable along said frame and movable up and down thereby to inoperative and operative positions.

55. In apparatus of the character described, an elevator adapted to receive a pile of sheets and feed the same upwardly, means supporting the elevator, a frame pivoted on said means and extending over the elevator to swing up and down above the same, and sheet separating means and pile guiding means mounted on and adjustable laterally and longitudinally along said frame and movable up and down thereby to inoperative and operative positions.

56. In apparatus of the character described, a main frame, a pile elevator mounted on said frame and adapted to receive and elevate a pile of sheets, an auxiliary frame extending over the elevator and pivoted on the main frame at the top and front thereof to swing up and down above said elevator about an axis extending transversely of the direction of movement of sheets fed from said pile, and sheet separating means mounted on the rear of the auxiliary frame to be swung thereby upwardly and forwardly above the elevator to an inoperative position and enable the pile to be loaded thereon through the rear of the feeder, the auxiliary frame and the sheet separating means being adapted to swing downwardly and rearwardly toward said elevator to bring said sheet separating means into an operative position with respect to the pile.

57. In apparatus of the character described, a main frame, a pile elevator mounted on said frame and adapted to receive and elevate a pile of sheets, an auxiliary frame extending over the elevator and pivoted on the main frame at the top and front thereof to swing up and down above the elevator, and sheet separating means and pile guiding means mounted on the auxiliary frame to be swung thereby upwardly and forwardly above the elevator to inoperative positions and downwardly and rearwardly toward said elevator to operative positions.

58. In apparatus of the character described, an elevator adapted to receive a pile of sheets and feed the same upwardly, supporting means for the elevator, arms and a cross member forming therewith a frame extending over the elevator and pivoted on said supporting means to swing up and down above said elevator, and sheet engaging means carried on the cross member of said frame and movable up and down by the latter to inoperative and operative positions respectively.

59. In apparatus of the character described, an elevator adapted to receive a pile of sheets and feed the same upwardly, supporting means for the elevator, arms and a cross member forming therewith a frame extending over the elevator and pivoted on said supporting means to swing up and down above said elevator, sheet engaging means carried on the cross member of said frame and movable up and down by the latter to inoperative and operative positions respectively and means for moving the cross member and said sheet engaging means along said arms to various positions of adjustment.

60. In apparatus of the character described, an elevator adapted to receive a pile of sheets and feed the same upwardly, supporting means for the elevator, arms and a cross member forming therewith a frame extending over the elevator and pivoted on said supporting means to swing up and down above said elevator, sheet engaging means carried on and adjustable along the cross member of said frame and movable up and down by the latter to inoperative and operative positions respectively, and means for moving the cross member and said sheet engaging means along said arms to various positions of adjustment.

61. In aparatus of the character described, an elevator adapted to receive a pile of sheets and feed the same upwardly, supporting means for the elevator, a frame extending over the elevator and pivoted on its supporting means to swing up and down above said elevator, sheet engaging means mounted on said frame and movable up and down therewith to inoperative and operative positions respectively, and means for holding the sheet engaging means and the frame up above the elevator when the frame is raised and providing for lowering movement of the frame and sheet engaging means toward said elevator.

62. In apparatus of the character described, an elevator adapted to receive a pile of sheets and feed the same upwardly, supporting means for the elevator, a frame extending over the elevator and pivoted on its supporting means to swing up and down above said elevator, sheet engaging means mounted on said frame and movable up and down therewith to inoperative and operative positions respectively, and connections between the elevator supporting means and the frame adapted to hold the sheet engaging means up above the elevator when the frame is raised and providing for lowering movement of said frame and said sheet engaging means toward said elevator.

63. In apparatus of the character described, an elevator adapted to receive a pile of sheets and feed the same upwardly, a main frame supporting the elevator, an auxiliary frame extending over the elevator and pivoted on the main frame to swing up and down above said elevator, sheet engaging means mounted on said auxiliary frame and movable up and down therewith to inoperative and operative positions respectively, a member pivoted on the main frame and associated with the auxiliary frame so that the latter may swing up and down as aforesaid, and latch means on said member and the auxiliary frame for holding the sheet engaging means and the auxiliary frame up above the elevator when the auxiliary frame is raised, said latch means providing for lowering movement of the frame and the sheet engaging means toward said elevator.

64. In apparatus of the character described, a main frame, an auxiliary frame extending over the main frame and pivoted thereon to swing up and down, sheet separating means mounted on and movable up and down with the main frame, and connections between the main and auxiliary frames adapted to hold the sheet separating means and the auxiliary frame up when the latter is raised, said connections providing for lowering movement of the auxiliary frame and the sheet separating means.

65. In apparatus of the character described, a main frame, an auxiliary frame extending over the main frame and pivoted thereon to swing up and down, pile guiding means mounted on and movable up and down with the auxiliary frame, and connections between the main and auxiliary frames adapted to hold the pile guiding means and the auxiliary frame up when the latter is raised, said connections providing for lowering movement of the auxiliary frame and the pile guiding means.

66. In apparatus of the character described, a main frame on which a pile of sheets may be supported, sheet separating means adapted to separate sheets successively from said pile, a pivotally mounted auxiliary frame carrying the sheet separating means and extending over the main frame to swing up and down and raise and lower said sheet separating means to inoperative and operative positions respectively, a source of power for operating the sheet separating means, and means continuously connecting said source of power with the sheet separating means regardless of the position of the latter and said auxiliary frame.

67. In apparatus of the character described, a main frame on which a pile of sheets may be supported, a pivotally mounted auxiliary frame extending over the main frame, sheet separating means mounted on the auxiliary frame to be swung up and down thereby to inoperative and operative positions respectively, means for adjusting the sheet separating means to various positions on the auxiliary frame, a source of power for operating the sheet separating means, and means continuously connecting the sheet separating means with said source of power regardless of the position of said auxiliary frame and the position of said sheet separating means thereon.

68. In apparatus of the character described, means to be fed, a pile feeder arranged to swing toward and away from said means, sheet feeding means carried by the pile feeder forwardly thereof in a single plane, said sheet feeding means comprising a plurality of rollers journalled on axes extending transversely of the direction of movement of sheets fed from said feeder and said rollers being adapted to swing with the pile feeder toward and away from the means to be fed, driving connections between the rollers, a source of power for driving said rollers through said connections, and means continuously connecting said source of power with the rollers regardless of the position of the latter and said pile feeder with respect to said first named means.

69. In apparatus of the character described, a main frame, a pile elevator thereon, means for separating sheets successively from a pile thereof on the elevator and pivoted on the main frame to swing thereon into operative and inoperative positions, sheet receiving means, and means for feeding the separated sheets to the sheet receiving means and including a series of driven rollers carried by the main frame and extending forwardly and downwardly therefrom in an inclined plane to said sheet receiving means, said rollers being journalled on axes extending transversely of the direction of movement of sheets fed from said pile.

JOHN H. McELROY.